(12) United States Patent
Tominaga et al.

(10) Patent No.: US 11,708,069 B2
(45) Date of Patent: Jul. 25, 2023

(54) OBSTACLE AVOIDANCE APPARATUS AND OBSTACLE AVOIDANCE ROUTE GENERATING APPARATUS

(71) Applicant: Mitsubishi Electric Corporation, Tokyo (JP)

(72) Inventors: Kenta Tominaga, Tokyo (JP); Tomoki Uno, Tokyo (JP); Shota Kameoka, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 16/528,872

(22) Filed: Aug. 1, 2019

(65) Prior Publication Data

US 2020/0070819 A1 Mar. 5, 2020

(30) Foreign Application Priority Data

Sep. 5, 2018 (JP) .................. 2018-165654

(51) Int. Cl.
*B60W 30/09* (2012.01)
*B60W 10/04* (2006.01)
*B60W 10/20* (2006.01)
*B60W 30/095* (2012.01)
(Continued)

(52) U.S. Cl.
CPC ............ *B60W 30/09* (2013.01); *B60W 10/04* (2013.01); *B60W 10/20* (2013.01); *B60W 30/095* (2013.01); *B60W 50/0097* (2013.01); *G08G 1/166* (2013.01); *B60W 2554/00* (2020.02);
(Continued)

(58) Field of Classification Search
CPC combination set(s) only.
See application file for complete search history.

(56) References Cited

U.S. PATENT DOCUMENTS

| 2010/0030426 A1* | 2/2010 | Okita ................. B60W 40/072 701/41 |
| 2010/0235035 A1 | 9/2010 | Nishira et al. |

(Continued)

FOREIGN PATENT DOCUMENTS

| JP | 2007-253745 A | 10/2007 |
| JP | 2010-202147 A | 9/2010 |

(Continued)

*Primary Examiner* — Jeff A Burke
*Assistant Examiner* — Zachary Joseph Wallace
(74) *Attorney, Agent, or Firm* — Sughrue Mion, PLLC; Richard C. Turner

(57) ABSTRACT

Provided is an obstacle avoidance apparatus that can specify a distance between a subject vehicle and an obstacle when making the subject vehicle avoid the obstacle. An obstacle avoidance apparatus includes: an obstacle movement predictor that predicts movement of the obstacle; and a constraint generator that establishes a constraint on a state quantity or a control input of the subject vehicle by determining whether to steer right or left around the obstacle and defining a no-entry zone for preventing the subject vehicle from colliding with the obstacle. The constraint generator incorporates, into the no-entry zone, an area to the left of the obstacle when determining to steer right around the obstacle, and incorporates, into the no-entry zone, an area to the right of the obstacle when determining to steer left around the obstacle.

30 Claims, 16 Drawing Sheets

(51) Int. Cl.
  *B60W 50/00*   (2006.01)
  *G08G 1/16*    (2006.01)
(52) U.S. Cl.
  CPC ... *B60W 2710/20* (2013.01); *B60W 2720/106* (2013.01); *B60W 2720/14* (2013.01)

(56) References Cited

U.S. PATENT DOCUMENTS

| | | | | |
|---|---|---|---|---|
| 2015/0166062 | A1* | 6/2015 | Johnson | B60W 10/20 |
| | | | | 701/41 |
| 2016/0347181 | A1* | 12/2016 | Yamakado | B60L 15/20 |
| 2017/0029026 | A1* | 2/2017 | Okuda | B60W 30/09 |
| 2018/0178789 | A1* | 6/2018 | Nishimura | G08G 1/161 |
| 2018/0222474 | A1* | 8/2018 | Hiraiwa | B60W 50/14 |
| 2018/0292834 | A1* | 10/2018 | Kindo | B60W 30/00 |
| 2018/0326979 | A1* | 11/2018 | Tsuruoka | B60W 50/14 |
| 2019/0031198 | A1* | 1/2019 | Aoki | B60W 40/02 |
| 2019/0084561 | A1 | 3/2019 | Takeda et al. | |
| 2019/0196487 | A1* | 6/2019 | Akiyama | B60W 30/18163 |
| 2019/0291726 | A1* | 9/2019 | Shalev-Shwartz | B60W 30/18154 |

FOREIGN PATENT DOCUMENTS

| | | | |
|---|---|---|---|
| WO | 2016/189727 | A1 | 12/2016 |
| WO | 2017/159539 | A1 | 9/2017 |

\* cited by examiner

F I G. 1
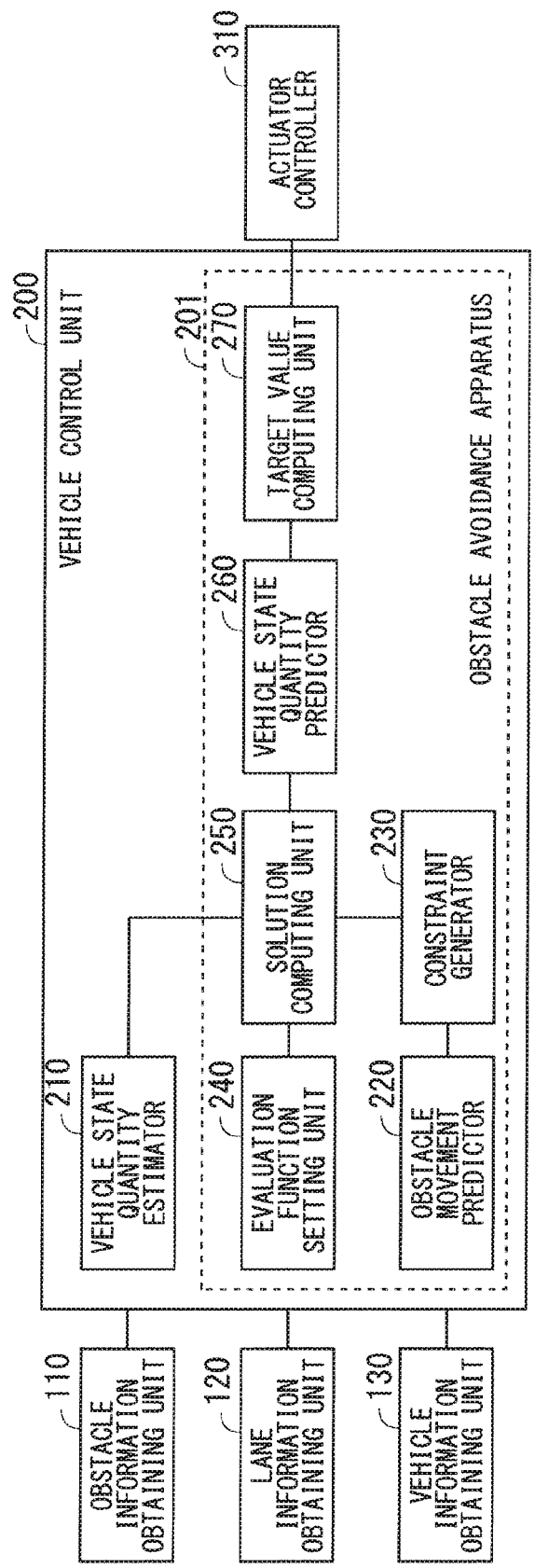

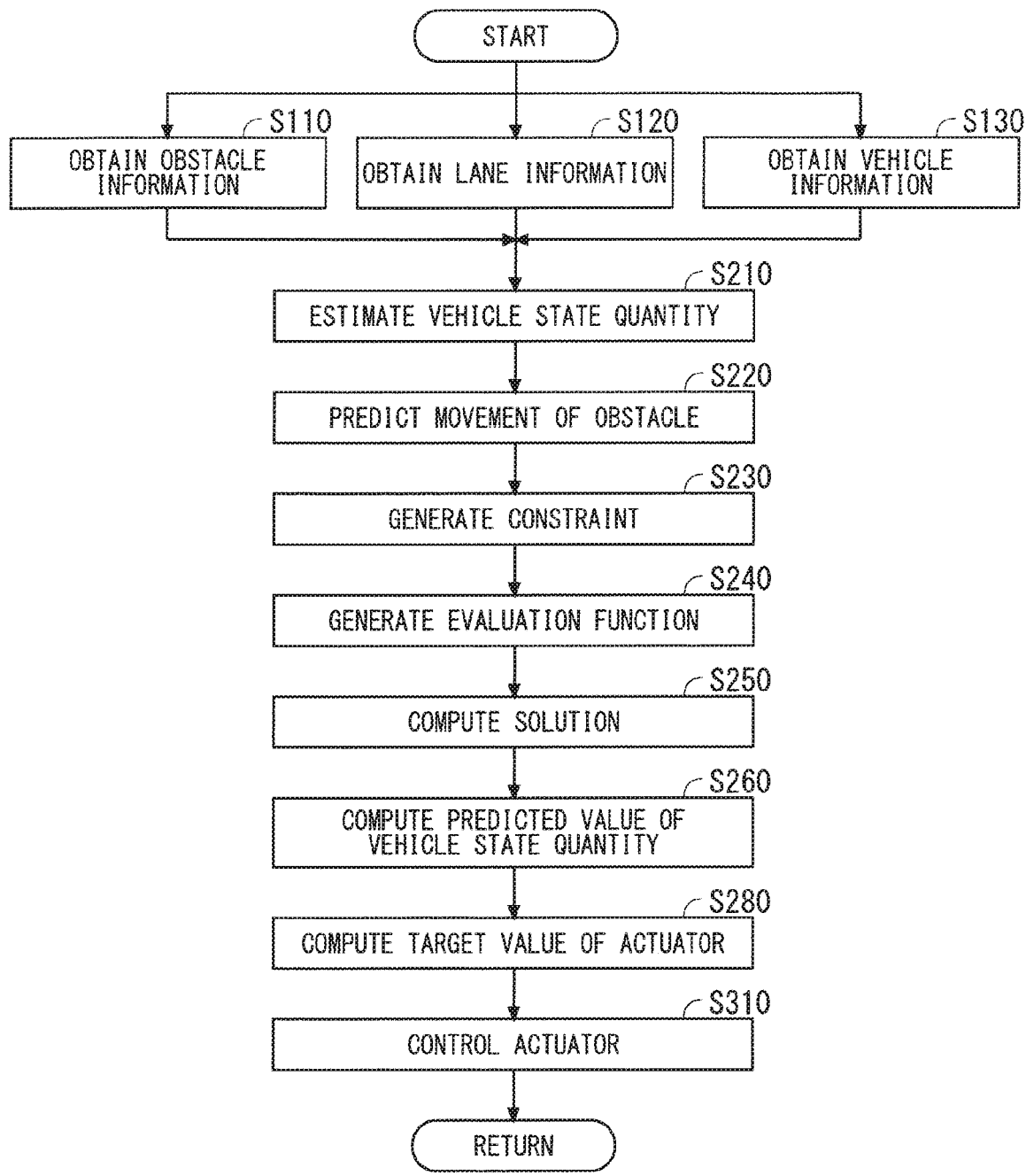

OBSTACLE AVOIDANCE APPARATUS AND OBSTACLE AVOIDANCE ROUTE GENERATING APPARATUS

BACKGROUND OF THE INVENTION

Field of the Invention

The present invention relates to an obstacle avoidance apparatus and an obstacle avoidance route generating apparatus for a vehicle.

Description of the Background Art

Various obstacle avoidance apparatuses have been proposed which detect an obstacle in a road on which a subject vehicle is traveling and snake the subject vehicle avoid the obstacle by automatically steering the subject vehicle. For example, the obstacle avoidance apparatus disclosed in Japanese Patent Application Laid-Open No. 2007-253745 sets an evaluation function based on a position of an obstacle, a road boundary, a predicted travel path of the subject vehicle, and a predicted attitude angle and a target attitude angle of the subject vehicle after avoiding the obstacle, and controls the subject vehicle so that the subject vehicle will follow the predicted travel path with which the output value of the evaluation function is the smallest to make the subject vehicle avoid the obstacle. This evaluation function is set so that the output value decreases as a distance between the subject vehicle and the obstacle and a distance between the subject vehicle and the road boundary increase and as a difference between the predicted attitude angle and the target attitude angle of the subject vehicle after avoiding the obstacle decreases.

However, the obstacle avoidance apparatus disclosed in Japanese Patent Application Laid-Open No. 2007-253745 cannot clearly specify a distance between the subject vehicle and an obstacle when making the subject vehicle avoid the obstacle (hereinafter referred to as an "avoidance distance"). In other words, the avoidance distance depends on a predicted travel path of the subject vehicle which is determined by weights to an evaluation function, i.e., three factors of the avoidance distance, a distance between the subject vehicle and a road boundary, and a difference between a predicted attitude angle and a target attitude angle of the subject vehicle after avoiding the obstacle. Thus, the obstacle avoidance apparatus cannot clearly specify the avoidance distance. Depending on the setting of the evaluation function, a predicted travel path along which the subject vehicle collides with an obstacle may yield the smallest output value of the evaluation function since the obstacle avoidance apparatus cannot specify the avoidance distance.

SUMMARY

Provided is an obstacle avoidance apparatus that can specify a distance (an avoidance distance) between a subject vehicle and an obstacle when making the subject vehicle avoid the obstacle.

The obstacle avoidance apparatus according to the present invention includes an obstacle movement predictor, a constraint generator, an evaluation function setting unit, a solution computing unit, a vehicle state quantity predictor, and a target value computing unit as described below. The obstacle movement predictor predicts movement of an obstacle around a subject vehicle, based on obstacle information including information on a position of the obstacle. The constraint generator establishes a constraint on a state quantity or a control input of the subject vehicle by determining whether to steer right or left around the obstacle based on the predicted movement of the obstacle and defining a no-entry zone for preventing the subject vehicle from colliding with at least the obstacle. The evaluation function setting unit sets an evaluation function for evaluating at least a route following error as an evaluation item so that a degree of evaluation increases as the route following error is smaller, the route following error being an error in a predicted route with respect to a target route of the subject vehicle. The solution computing unit computes, under the constraint, a solution for increasing the degree of evaluation on the evaluation function. The vehicle state quantity predictor computes a predicted value of the state quantity of the subject vehicle based on the solution. The target value computing unit computes a target value of an actuator that controls an amount of steering of the subject vehicle, based on at least one of the solution and the predicted value of the state quantity. The constraint generator incorporates, into the no-entry zone, an area to the left of the obstacle when determining to steer right around the obstacle, and incorporates, into the no-entry zone, an area to the right of the obstacle when determining to steer left around the obstacle.

According to the present invention, the vehicle control for keeping a lane and the vehicle control for avoiding an obstacle can be performed with the same logic. Furthermore, the obstacle can be avoided by setting a no-entry zone of the subject vehicle and establishing a constraint on a state variable of the subject vehicle to clearly specify the minimum value of a distance (an avoidance distance) between the subject vehicle and the obstacle. Moreover, predetermining whether to steer right or left around an obstacle ensures leeway until the avoidance and the smooth avoidance operation. Thus, the riding comfort will be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a configuration of an obstacle avoidance system according to Embodiment 1 of the present invention;

FIG. 16 is a flowchart indicating operations of the obstacle avoidance system according Embodiment 5 of the present invention.

DESCRIPTION OF THE PREFERRED EMBODIMENTS

Embodiment 1

Figure 2:
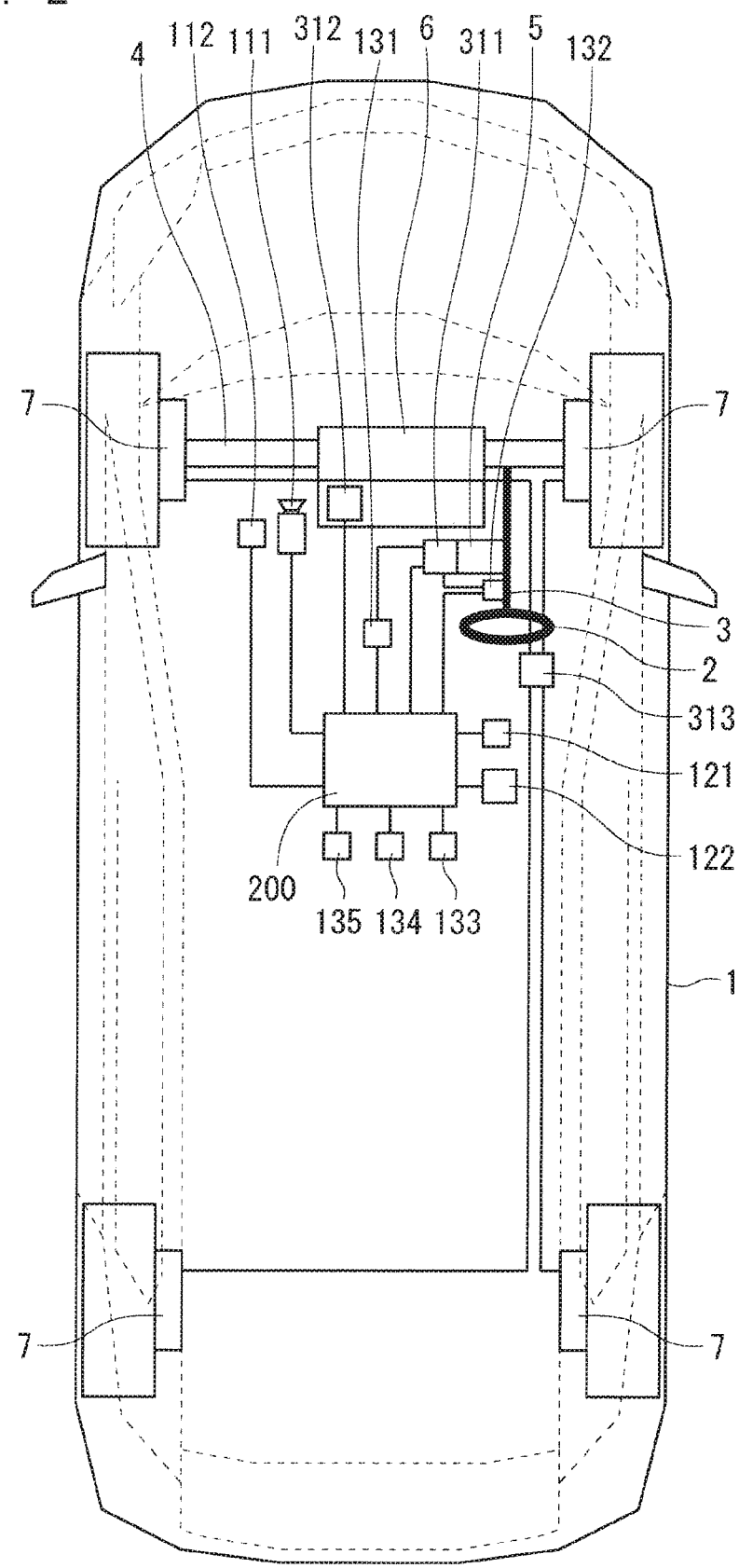
FIG. 2 illustrates an example hardware configuration of the obstacle avoidance system according to Embodiment 1 of the present invention.

FIG. 1 is a block diagram illustrating a schematic configuration of an obstacle avoidance system according to Embodiment 1 of the present invention. The obstacle avoidance system is mounted on a vehicle, and includes a vehicle control unit 200, and an obstacle information obtaining unit 110, a lane information obtaining unit 120, a vehicle information obtaining unit 130, and an actuator controller 310 each of which is connected to the vehicle control unit 200.

The vehicle control unit 200 controls the overall operations of a vehicle on which the obstacle avoidance system is mounted (hereinafter referred to as a "subject vehicle"). The vehicle control unit 200 is, for example, an advanced driver-assistance systems Electronic Control Unit (ADAS-ECU).

The obstacle information obtaining unit 110 obtains obstacle information including information on a position of an obstacle around the subject vehicle. The obstacle information obtaining unit 110 is, for example, a forward camera that captures a landscape image ahead of the subject vehicle. Alternatively, the obstacle information obtaining unit 110 may be, for example, a light detection and ranging (LiDAR), a radar, a sonar, an inter-vehicle communication device, or a roadside-to-vehicle communication device.

The lane information obtaining unit 120 obtains lane information that is information on a traveling lane of the subject vehicle. The lane information includes information on positions of left and right dividing lines of a traveling lane of the subject vehicle and on positions of the center of the lane. The lane information obtaining unit 120 is, for example, a forward camera. Alternatively, the lane information obtaining unit 120 may obtain the lane information from a result of detecting the lane by the LiDAR and map data, or from a position of the subject vehicle measured by a global navigation satellite system (GNSS) sensor and map data.

The vehicle information obtaining unit 130 obtains vehicle information such as a speed, an acceleration, an orientation, and an angular velocity of the subject vehicle. The vehicle information obtaining unit 130 is, for example, a steering angle sensor, a steering torque sensor, a yaw rate sensor, a speed sensor, or an acceleration sensor.

The actuator controller 310 controls an actuator of the subject vehicle so that the actuator attains a target value. The actuator controller 310 is, for example, an electric power steering ECU (EPS-ECU), a powertrain ECU, or a brake ECU.

As illustrated in FIG. 1, the vehicle control unit 200 includes an obstacle avoidance apparatus 201 and a vehicle state quantity estimator 210. Further, the obstacle avoidance apparatus 201 includes an obstacle movement predictor 220, a constraint generator 230, an evaluation function setting unit 240, a solution computing unit 250, a vehicle state quantity predictor 260, and a target value computing unit 270.

The vehicle state quantity estimator 210 estimates a vehicle state of the subject vehicle, based on the vehicle information obtained by the vehicle information obtaining unit 130. The obstacle movement predictor 220 predicts movement of an obstacle around the subject vehicle, based on the obstacle information obtained by the obstacle information obtaining unit 110.

The constraint generator 230 generates a constraint on a state quantity or a control input of the subject vehicle when the subject vehicle avoids an obstacle, based on the predicted movement of the obstacle obtained by the obstacle movement predictor 220 and on the lane information obtained by the lane information obtaining unit 120. The constraints to be generated by the constraint generator 230 include defining of a no-entry zone for preventing the subject vehicle from colliding with an obstacle, which will be described in detail later. Before defining a no-entry zone, the constraint generator 230 determines whether to steer right or left around an obstacle, that is, whether the subject vehicle passes to the right or the left of an obstacle when the subject vehicle avoids the obstacle. Then, the constraint generator 230 defines the no-entry zone of the subject vehicle based on a result of the determination.

The evaluation function setting unit 240 sets an evaluation function for evaluating a route following error that is at least an error in a predicted route with respect to a target route of the subject vehicle. The solution computing unit 250 computes, under the constraint generated by the constraint generator 230, a solution for reducing the evaluation function, that is, a predicted value of the control input. The vehicle state quantity predictor 260 computes a predicted value of a vehicle state quantity of the subject vehicle, based on the predicted value of the control input computed by the solution computing unit 250.

The target value computing unit 270 computes a target value of an actuator from the predicted value of the vehicle state quantity computed by the vehicle state quantity predictor 260 and the predicted value of the control input computed by the solution computing unit 250. Upon receipt of the target value of the actuator computed by the target value computing unit 270, the actuator controller 310 controls the actuator so that the actuator attains the target value.

FIG. 2 illustrates an example hardware configuration of the obstacle avoidance system. A subject vehicle 1 on which the obstacle avoidance system is to be mounted includes a steering wheel 2, a steering axle 3, a steering unit 4, an EPS motor 5, a powertrain unit 6, brake units 7, a forward camera 111, a radar sensor 112, a GNSS sensor 121, a navigation device 122, a steering angle sensor 131, a steering torque sensor 132, a yaw rate sensor 133, a speed sensor 134, an acceleration sensor 135, the vehicle control unit 200 illustrated in FIG. 1, an EPS controller 311, a powertrain controller 312, and a brake controller 313.

The steering wheel 2 is also called a hand wheel for the driver to operate the subject vehicle 1. The steering wheel 2 is joined to the steering axle 3 communicating to the steering unit 4. The steering unit 4 rotatably supports the front wheels as the steering tires, and is supported by a car frame so that the steering unit 4 can be steered. Thus, a steering torque generated by the driver through operating the steering wheel 2 causes the steering axle 3 to rotate. The steering unit 4 horizontally steers the front wheels according to the rotation of the steering axle 3. Consequently, the driver can manipulate an amount of lateral movement of the subject vehicle 1 in moving forward or backward.

The steering axle 3 may be rotated by the EPS motor 5. The EPS controller 311 controls the current that flows through the EPS motor 5, so that the front wheels can be steered independent of the operation of the steering wheel 2 by the driver.

The vehicle control unit 200 is connected to the forward camera 111, the radar sensor 112, the GNSS sensor 121 navigation device 122, the steering angle sensor 131, the steering torque sensor 132, the yaw rate sensor 133, the speed sensor 134, the acceleration sensor 135, the EPS controller 311, the powertrain controller 312, and the brake controller 313.

The forward camera 111 is disposed in a position where the dividing lines ahead of the vehicle can be detected as an image, and detects a forward environment of the subject vehicle such as the lane information or a position of an obstacle, based on the image information. Although FIG. 2 illustrates only the forward camera that detects the forward environment, the subject vehicle 1 may include a camera that detects a rear or lateral environment. The radar sensor 112 irradiates an obstacle with radar beam, and detects the reflected wave to output a relative distance and a relative speed of the obstacle with respect to the subject vehicle 1. The radar sensor 112 may be a known device such as a millimeter wave radar, a LiDAR, a laser range finder, or a ultrasonic radar. The obstacle information obtaining unit 110 illustrated in FIG. 1 includes the forward camera 111 and the radar sensor 112.

The GNSS sensor 121 receives radio waves from a positioning satellite via an antenna, and outputs an absolute position and an absolute orientation of the subject vehicle 1 through positioning computation. The navigation device 122 has a function of computing the optimal traveling route to a destination set by the driver, and stores map data including road information on roads for constructing a road network. The road information is map node data for representing road alignments. Each map node data includes information on, for example, an absolute position (a latitude, a longitude, an altitude) of a node, a lane width, an angle of cant, and an angle of dip. The lane information obtaining unit 120 illustrated in FIG. 1 includes the GNSS sensor 121 and the navigation device 122.

The steering angle sensor 131 detects a steering angle of the steering wheel 2. The steering torque sensor 132 detects a steering torque of the steering axle 3. The yaw rate sensor 133 detects a yaw rate of the subject vehicle 1. The speed sensor 134 detects a speed of the subject vehicle 1. The acceleration sensor 135 detects an acceleration of the subject vehicle 1. The vehicle information obtaining unit 130 illustrated in. FIG. 1 includes the steering angle sensor 131, the steering torque sensor 132, the yaw rate sensor 133, the speed sensor 134, and the acceleration sensor 135.

The vehicle control unit 200 is an integrated circuit such as a microprocessor, and includes an A/D conversion circuit, a DIA conversion circuit, a processor such as a central processing unit (CPU), and a memory such as a read only memory (ROM) and a random access memory (RAM). The processor of the vehicle control unit 200 processes information received from each of the sensors, according to a program stored in the ROM to compute a target steering angle, a target driving force, and a target braking force of the subject vehicle 1.

In other words, the vehicle control unit 200 includes a memory to store a program which, when executed by a processor, consequently performs processes of: predicting movement of an obstacle around the subject vehicle 1, based on obstacle information including information on a position of the obstacle; establishing a constraint on a state quantity or a control input of the subject vehicle 1 by determining whether to steer right or left around the obstacle based on the predicted movement of the obstacle and defining a no-entry zone for preventing the subject vehicle 1 from colliding with at least the obstacle; setting an evaluation function for evaluating at least a route following error as an evaluation item so that a degree of evaluation increases as the route following error is smaller, the route following error being an error in a predicted route with respect to a target route of the subject vehicle 1; computing, under the constraint, a solution for increasing the degree of evaluation on the evaluation function; computing a predicted value of the slate quantity of the subject vehicle 1 based on the solution; and computing a target value of an actuator that controls an amount of steering of the subject vehicle 1, based on at least one of the solution and the predicted value of the state quantity. Put it differently, this program causes a computer to execute procedures or methods of operations of the constituent elements of the obstacle avoidance apparatus 201.

The vehicle control unit 200 transmits the target steering angle to the EPS controller 311, transmits the target driving force to the powertrain controller 312, and transmits the target braking force to the brake controller 313. When the vehicle control unit 200 does not perform acceleration and deceleration control (control an amount of acceleration or deceleration), the powertrain controller 312 and the brake controller 313 do not have to be connected to the vehicle control unit 200.

The EPS controller 311 controls the EPS motor 5 so that the EPS motor attains the target steering angle received from the vehicle control unit 200. The powertrain controller 312 controls the powertrain unit 6 so that the powertrain unit 6 attains the target driving force received from the vehicle control unit 200. The brake controller 313 controls the brake unit 7 so that the brake unit 7 attains the target braking force received from the vehicle control unit 200. The actuator controller 310 illustrated in FIG. 1 includes the EPS controller 311, the powertrain controller 312, and the brake controller 313.

When the driver controls the speed, the powertrain controller 312 controls the powertrain unit 6 based on a depression amount of an accelerator pedal, and the brake controller 313 controls the brake unit 7 based on a depression amount of a brake pedal.

Although FIG. 2 illustrates, as the example of the subject vehicle 1, a vehicle that applies only an engine as the driving power source, the subject vehicle 1 may be an electrical car that applies only an electric motor as the driving power source, or a hybrid car that applies both the engine and the electric motor as the driving power source.

Figure 3:
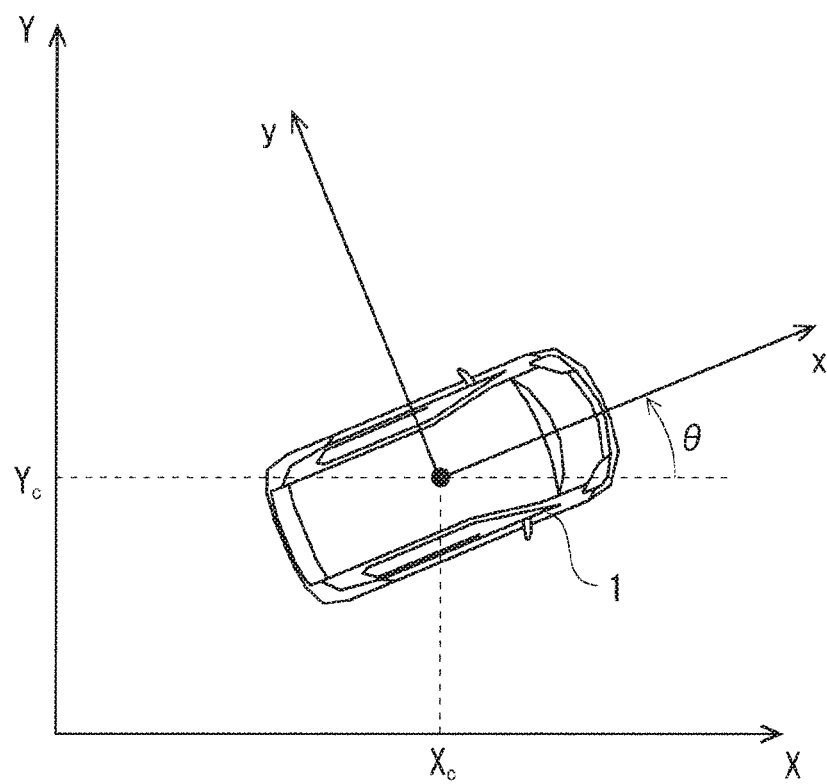
FIG. 3 illustrates a coordinate system to be applied in Embodiment 1 of the present invention.

Next, operations of the obstacle avoidance system according to Embodiment 1 will be described. FIG. 3 schematically illustrates a coordinate system to be applied to the obstacle avoidance system according to Embodiment 1. In FIG. 3, X- and Y-axes represent the inertial coordinate system, and $X_c$, $Y_c$, and $\theta$ represent a center-of-gravity position and an azimuth angle of the subject vehicle 1 in the inertial coordinate system. x- and y-axes represent the subject-vehicle coordinate system with respect to the center of gravity of the subject vehicle 1 as the origin. The x-axis is equal to a direction in which the subject vehicle 1 proceeds, and the y-axis is perpendicular to the x-axis to the left. In Embodiment 1, the center-of-gravity position $X_c$ and $Y_c$ and the azimuth angle θ of the subject vehicle 1 are reset to 0 every control period. In other words, the inertial coordinate system is made to coincide with the subject-vehicle coordinate system every control period. When change in the azimuth angle θ is smaller, this process enables one to regard the X direction as a forward direction of the subject vehicle 1 and the Y direction as a lateral direction of the subject vehicle 1.

The solution computing unit 250 of the obstacle avoidance apparatus 201 predicts a behavior of the subject vehicle 1 from the current time 0 to a future time point after a lapse of a time $T_h$ at regular intervals $T_S$ using a dynamic vehicle model mathematically representing dynamics of vehicles. Then, the solution computing unit 250 solves, at regular intervals, an optimization problem for finding a control input u for minimizing an evaluation function that represents a desired operation of the subject vehicle 1 to compute, as the solution, the optimal target amount of steering, or the optimal target amount of steering and the optimal target acceleration. Here, the number of the vehicle state quantities to be predicted is N ($N=T_h/T_s$). The time from the current time to the future time point after a lapse of the time $T_h$ will be referred to as a "horizon".

The solution for the optimization problem may not be the one that always minimize the evaluation function but may be any as long as the degree of evaluation increases as the evaluation function is smaller. For example, an input value that can make the evaluation function smaller than a predefined threshold may be the solution. When the evaluation function does not fall below the threshold even by performing repeated calculation a predefined number of times, an input value that can minimize the evaluation function among input values applied in the repeated calculations may be the solution.

Although the optimization problem is handled as a minimization problem according to Embodiment 1, the optimization problem may be handled as a maximization problem by reversing the sign of the evaluation function. In such a case, the solution for the optimization problem does not always have to maximize the evaluation function. For example, an input value that can make the evaluation function larger than the predefined threshold may be the solution. When the evaluation function does not exceed the threshold even by performing repeated calculation a predefined number of times, an input value that can maximize the evaluation function among input values applied in the repeated calculations may be the solution.

Examples of the optimization problem to be solved by the solution computing unit 250 will be described. In the following description, the symbol "_" will mean an underscore attached to a subsequent character, the symbol "—" will mean an overline attached to a subsequent character, and the symbol "^" will mean a hat (caret) attached to a subsequent character.

According to Embodiment 1, the solution computing unit 250 solves the following optimization problems with constraints at regular intervals, $\min_u J$ (Equation 101)

s.t. $\dot{x}=f(x,u)$ $x_0=x(0)$ $g(x,u)\leq 0$ (Equation 102)

Here, J denotes an evaluation function, x denotes a vehicle state quantity, u denotes a control input, f denotes a vector-valued function on a dynamic vehicle model, $x_0$ denotes an initial value, and g denotes a vector-valued function on constraints.

According to Embodiment 1, the vehicle control unit 200 performs only steering control, and the vehicle state quantity x and the control input u will be set as follows.

$x=[X_c,Y_c,\theta,\beta,\gamma,\delta]^T$ (Equation 103)

$u=[\omega]^T$ (Equation 104)

Here, β denotes an angle of sideslip, γ denotes a yaw rate, δ denotes a steering angle, and ω denotes a steering angle velocity. There is no need to make the control input u coincide with a controlled variable of the actuator controller 310. Thus, the vehicle state quantity x and the control input u can be set independent of the controlled variable of the actuator controller 310. Substituting the steering angle velocity for the steering angle as the control input, the magnitude of variations in the steering angle can be easily limited depending on the evaluation function or settings of the constraints. Thus, the riding comfort of the vehicle will be improved.

The following two-wheel model will be used as the dynamic vehicle model.

$$\dot{x} = \begin{bmatrix} V\cos(\theta+\beta) \\ V\sin(\theta+\beta) \\ \gamma \\ -\gamma + \dfrac{2}{MV}(Y_f + Y_r) \\ \dfrac{2}{I}(l_f Y_f - l_r Y_r) \\ \omega \end{bmatrix}$$ (Equation 105)

Here, M denotes a mass of a vehicle, V denotes a speed, I denotes a yaw moment of inertia of the vehicle, and $l_f$ and $l_r$ denote distances from the center of gravity of the vehicle to the front axle and the rear axle, respectively. $Y_f$ and $Y_r$ denote cornering forces of the front wheel and the rear wheel, respectively. The following approximate expressions can be obtained using the cornering stiffnesses $C_f$ and $C_r$ of the front wheel and the rear wheel, respectively.

$Y_f = -C_f\left(\beta + \dfrac{l_f}{V}\gamma - \delta\right)$ (Equation 106)

$Y_r = -C_r\left(\beta - \dfrac{l_r}{V}\gamma\right)$ (Equation 107)

Rearranging Equation 105 using Equations 106 and 107, the following Equation is obtained as the dynamic vehicle model f.

$\dot{x} = f(x,u) =$ (Equation 107)

$$\begin{bmatrix} V\cos(\theta+\beta) \\ V\sin(\theta+\beta) \\ \gamma \\ -\left(1 + \dfrac{2(C_f l_f - C_r l_r)}{MV^2}\right)\gamma - \dfrac{2}{MV}(C_f + C_r)\beta + \dfrac{2C_f}{MV}\delta \\ -\dfrac{2}{IV}(C_f l_f^2 + C_r l_r^2)\gamma - \dfrac{2}{I}(C_f l_f - C_r l_r)\beta + \dfrac{2}{I}C_f l_f \delta \\ \omega \end{bmatrix}$$

The dynamic vehicle model may be other than the two-wheel model if the vehicle state quantity includes the position of the vehicle. $x=[X_c, Y_c, \theta, \beta, \gamma]^T$ and $u=[\delta]^T$ may hold to simplify the model.

The following Equation will be used for the evaluation function J according to Embodiment 1.

$$J = (h_N(x_N) - r_N)^T W_N (h_N(x_N) - r_N) + \sum_{k=0}^{N-1} (h(x_k, u_k) - r_k)^T W(h(x_k, u_k) - r_k)$$ (Equation 109)

Here, $x_k$ denotes a vehicle state quantity at a predicted point k (k=0, . . . , N), whereas $u_k$ denotes a control input at a predicted point k (k=0, . . . , N−1). h denotes a vector-valued function on an evaluation item, $h_N$ denotes a vector-valued function on the evaluation item at the end (a predicted point N), and $r_k$ denotes a target value at the predicted point k (k=0, . . . , N). Each of W and $W_N$ denotes a weighted matrix that is a diagonal matrix having weights to the respective evaluation items as diagonal components, and can be appropriately changed as a parameter. According to Embodiment 1, steering control is performed so that the vehicle travels along the center of the lane with a small control input. The vector-valued functions h and $h_N$ on an evaluation item will be set as follows.

$$h = [e_{Y,k}, \omega_k]^T$$ (Equation 110)

$$h_N = [e_{Y,N}]^T$$ (Equation 111)

Here, $e_{Y,k}$ denotes a route following error at the predicted point k (k=0, . . . , N) that is an error in a predicted route with respect to a target route of the subject vehicle. If the target route is represented by a function y=l(x) in the subject-vehicle coordinate system, the route following error $e_{Y,k} = Y_{c,k} - l(X_{c,k})$ holds. The target route may be any route represented by a function, for example, a route obtained by functional approximation of the center of the lane to be generated by the lane information obtaining unit 120. Then, the target values $r_k$ and $r_N$ will be set as follows so that the route following error $e_{Y,k}$ and a steering speed $\omega_k$ are reduced.

$$r_k = [0,0]^T (k=0, \ldots, N-1)$$ (Equation 112)

$$r_N = [0]^T$$ (Equation 113)

Without any obstacle in a horizon, the evaluation of the route following error allows the subject vehicle to keep the lane. If there is an obstacle in the horizon, setting a no-entry zone including the position of the obstacle allows the subject vehicle to avoid the obstacle. Thus, the same control logic allows the subject vehicle to keep the lane and avoid the obstacle, which leads to smooth avoidance of the obstacle. Although the evaluation items are set to evaluate only the route following error and the steering speed according to Embodiment 1, for example, an orientation and a yaw rate may be added to the evaluation items to improve the route following performance and the riding comfort.

Next, the vector-valued function g on constraints will be described. The function g is to set the vehicle state quantity x and upper and lower limit values of the control input u in the optimization problem with constraints. The optimization will be performed under a condition of g(x, u)≤0.

Assuming an upper limit value of the center-of-gravity position $Y_c$ of a vehicle as $\overline{Y_c}(>0)$ and a lower limit value thereof as $\underline{Y_c}(<0)$ and assuming an upper limit value of the steering speed $\omega$ as $\overline{\omega}(>0)$ and a lower limit value thereof as $\underline{\omega}(<0)$, the function g is set to define a no-entry zone and avoid an obstacle at a steering speed in a certain range according to Embodiment 1 as follows.

$$g = \begin{bmatrix} Y_c - \overline{Y_c} \\ -Y_c + \underline{Y_c} \\ \omega - \overline{\omega} \\ -\omega + \underline{\omega} \end{bmatrix}$$ (Equation 114)

When change in the azimuth angle θ is smaller in the horizon, the y direction can be considered as a lateral direction of the vehicle. Thus, setting the upper and lower limit values of $Y_c$ can establish a constraint on a lateral position of the vehicle. Moreover, setting the upper and lower limit values of the steering speed ω allows the vehicle control while the riding comfort is maintained. As indicated by Equation 114, representing a possible range of the vehicle state quantity or the control input by one continuous section can create advantages of simplifying an equation representing the constraints, reducing the computation load, and increasing a probability of finding a solution.

Figure 4:
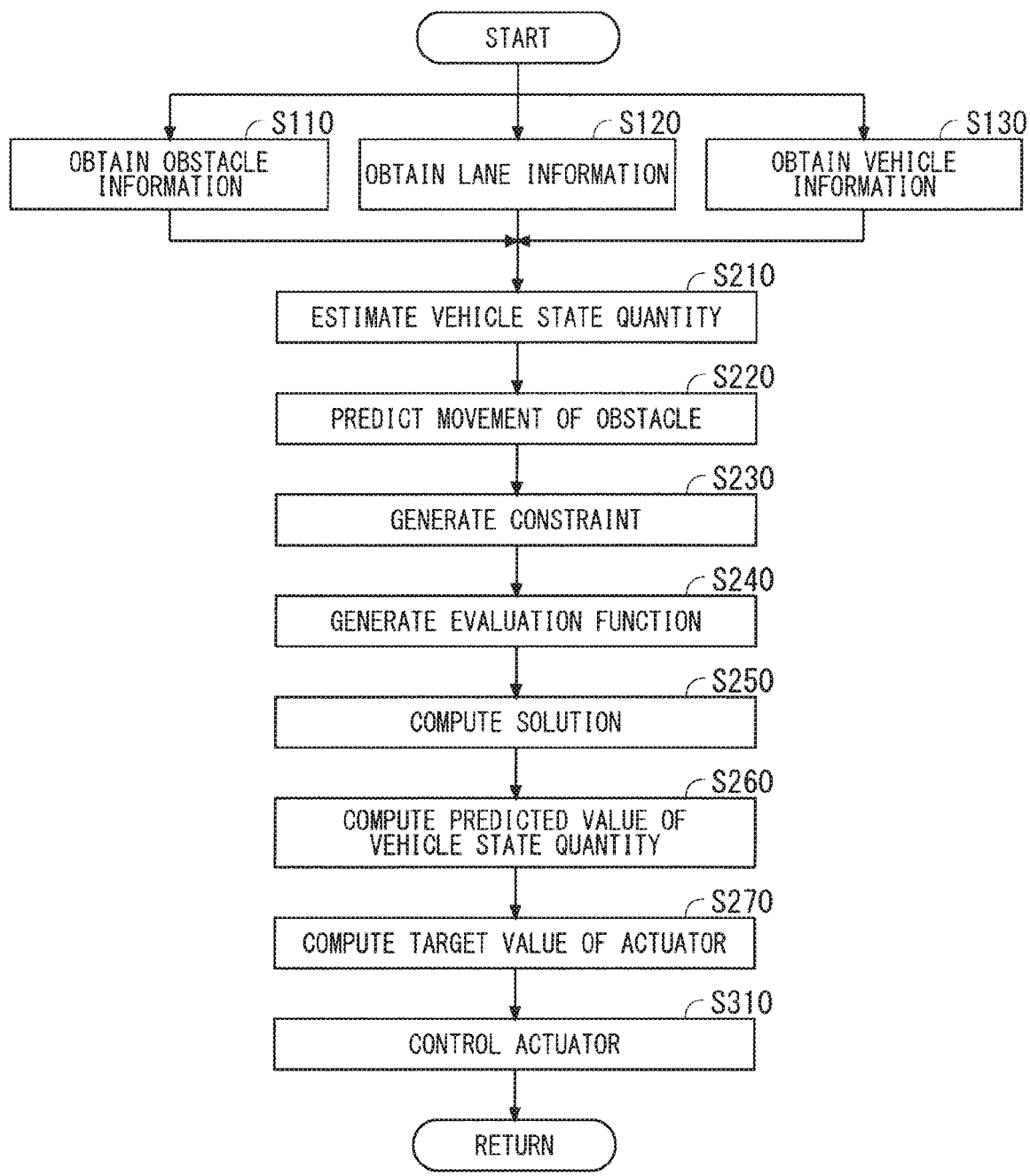
FIG. 4 is a flowchart indicating operations of the obstacle avoidance system according to Embodiment 1 of the present invention.

FIG. 4 is a flowchart indicating operations of the obstacle avoidance system according to Embodiment 1. The operations of the obstacle avoidance apparatus 201 will be described with reference to FIG. 4.

Upon start of the obstacle avoidance apparatus 201, the following steps S110, S120, and S130 will be performed. In Step S110, the obstacle information obtaining unit 110 obtains the obstacle information including information on a position of an obstacle. When an obstacle is ahead on the left of the subject vehicle 1, positions of the right front end $P_{FR}$, the right rear end $P_{RR}$, and the left rear end $P_{RL}$ of the obstacle in the subject-vehicle coordinate system are obtained as the obstacle information according to Embodiment 1. When an obstacle is ahead on the right of the subject vehicle 1, positions of the left front end $P_{FL}$, the left rear end $P_{RL}$, and the right rear end $P_{RR}$ of the obstacle in the subject-vehicle coordinate system are obtained as the obstacle information according to Embodiment 1. Moreover, the obstacle information obtaining unit 110 estimates, based on these obtained pieces of position information, the position of the left flout end $P_{FL}$ or the right front end $P_{FR}$ of the obstacle, the position $x_{obs}$, $y_{obs}$ of the center $O_{obs}$, the azimuth angle $\theta_{obs}$, the speed $V_{obs}$, the length $l_{obs}$, and the width $w_{obs}$ of the obstacle.

In Step S120, the lane information obtaining unit 120 obtains the lane information including information on positions of left and right dividing lines of a lane in which the subject vehicle should travel and on positions of the center of the lane. According to Embodiment 1, coefficients when the left and right dividing lines are represented by cubic polynomials in the subject-vehicle coordinate system are obtained as the lane information. In other words, the values $C_{10}$ to $C_{13}$ in the following Equation are obtained for the left dividing line.

$$y = C_{13}x^3 + C_{12}x^2 C_{11}x + C_{10}$$ (Equation 115)

Furthermore, the values $C_{r0}$ to $C_{r3}$ in the following Equation are obtained for the right dividing line.

$$y = C_{r3}x^3 + C_{r2}x^2 + C_{r1}x + C_{r0}$$ (Equation 116)

Here, the center of the lane (target route) will be represented by the following Equations.

$$y = l(x) = C_{c3}x^3 + C_{c2}x^2 + C_{c1}x + C_{c0} \quad \text{(Equation 117)}$$

$$C_{ci} = \frac{(C_{li} + C_{ri})}{2}(i = 0, \ldots, 3) \quad \text{(Equation 118)}$$

Information on the dividing lines may be represented by any function, not limited to the cubic polynomials. The target route may not be the center of the lane but any route represented by a function.

In Step S130, the vehicle information obtaining unit 130 obtains the vehicle information such as a steering angle, a yaw rate, a speed, and an acceleration of the subject vehicle. According to Embodiment 1, the steering angle $\delta$, the yaw rate $\gamma$, the speed V, and the acceleration "a" are obtained as the vehicle information.

Next in Step S210, the vehicle state quantity estimator 210 estimates a vehicle state quantity x of the subject vehicle. Known technologies such as a low-pass filter, an observer, a Kalman filter, and a particle filter are applicable for estimating the vehicle state quantity.

In Step S220, the obstacle movement predictor 220 predicts movement of an obstacle. Specifically, the obstacle movement predictor 220 predicts the center position coordinates $x_{obs,k}$ and $y_{obs,k}$ of the obstacle at each predicted point k (k=1, . . . , N). According to Embodiment 1, the motion of the obstacle is approximated by a linear uniform motion. Then, the obstacle movement predictor 220 predicts the center position coordinates $x_{obs,k}$ and $y_{obs,k}$ from the next Equations, using the center position coordinates $x_{obs,0}$ and $y_{obs,0}$, the azimuth angle $\theta_{obs}$, and the speed $V_{obs}$ of the obstacle at the current time that are obtained by the obstacle information obtaining unit 110.

$$x_{obs,k} = x_{obs,0} + V_{obs} \cos(\theta_{obs}) \cdot T_s \cdot k \quad \text{(Equation 119)}$$

$$y_{obs,k} = y_{obs,0} + V_{obs} \sin(\theta_{obs}) \cdot T_s \cdot k \quad \text{(Equation 120)}$$

In the presence of a plurality of obstacles, the obstacle movement predictor 220 predicts the center position coordinates $x_{obs,k}$ and $y_{obs,k}$ of each of the obstacles. The obstacle movement predictor 220 may predict the movement, not using the approximation of the linear uniform motion but using a vehicle model such as the two-wheel model.

Next in Step S230, the constraint generator 230 generates a constraint (Equation 114). Further in Step S240, the evaluation function setting unit 240 generates an evaluation function (Equation 109).

In Step S250, the solution computing unit 250 computes a solution for the optimization problem with the constraint, using the evaluation function (Equation 109) and the constraint (Equation 114). Known means such as Automatic Control and Dynamic Optimization (ACADO) developed by KU Leuven University and AutoGen that is an automated code generation tool that solves the optimization problem based on the Continuation/Generalized Minimum Residual (C/GMRES) method are applicable for computing the solution.

Next in Step S260, the vehicle state quantity predictor 260 computes a predicted value of the vehicle state quantity of the subject vehicle. When ACADO or AutoGen is applied in Step S250, a time series of control inputs (an optimal control input) u* optimized at each predicted point k (k=1, . . . , N−1) is equal to output of the solution computing unit 250. In other words, the output of the solution computing unit 250 is represented by the next Equation.

$$u^* = [u^*_0{}^T \ldots u^*_{N-1}{}^T]^T \quad \text{(Equation 121)}$$

Here, in the prediction of the vehicle state quantity in Step S260, the vehicle state quantity predictor 260 computes an optimized time series of vehicle state quantities (an optimal state quantity) x*, using u* and the dynamic vehicle model f. Here, x* is represented by the next Equation.

$$x^* = [x^*_0{}^T \ldots x^*_N{}^T]^T \quad \text{(Equation 122)}$$

Next in Step S270, the target value computing unit 270 computes a target value of an actuator. Since the vehicle control unit 200 performs only the steering control according to Embodiment 1, the target value computing unit 270 transmits the target steering angle $\delta_{ref}$ represented by the following Equation to the actuator controller 310.

$$\delta_{ref} = x^*_1[6]\delta^*_1 \quad \text{(Equation 123)}$$

Here, $x^*_k[i]$ denotes the i-th element of the optimal state quantity $x^*_k$ at the predicted point k. When the target value computing unit 270 transmits another target value to the actuator controller 310, the target value may be computed from the optimal state quantity x* or the optimal control input u*. When the target value computing unit 270 transmits, for example, a target steering speed $\omega_{ref}$ to the actuator controller 310, $\omega_{ref} = u^*_0[1] = \omega^*_0$ may hold.

Next in Step S310, the actuator controller 310 controls an actuator so that the actuator attains the target value received from the target value computing unit 270. Since the vehicle control unit 200 performs only the steering control according to Embodiment 1, the actuator controller 310 controls the EPS motor 5 so that the EPS motor 5 attains the target steering angle $\delta_{ref}$. The obstacle avoidance system repeats the aforementioned operations.

Figure 5:
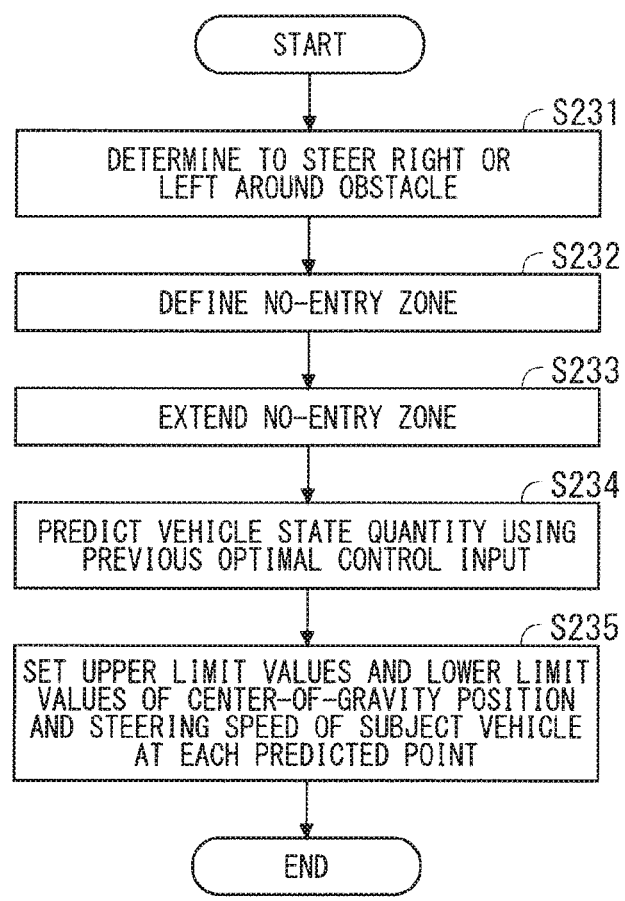
FIG. 5 is a flowchart for a process for generating a constraint according to Embodiment 1 of the present invention.

Here, the constraint (Equation 114) to be generated by the constraint generator 230 in Step S230 of FIG. 4 will be described. FIG. 5 is a flowchart for the process for generating the constraint.

In the constraint generation process, the constraint generator 230 determines in Step S231 whether to steer right or left around an obstacle. Since predetermining whether to steer right or left around the obstacle ensures leeway until the avoidance, the avoidance operation will be smoothly performed, and the riding comfort will be improved. This determination is made based on a result of predicting the movement of the obstacle.

The constraint generator 230 can determine whether to steer right or left around an obstacle, for example, based on a position of the obstacle in a traveling lane of the subject vehicle. In other words, the constraint generator 230 may determine to steer right around an obstacle when the obstacle is to the left of the center of the traveling lane of the subject vehicle and determine to steer left around an obstacle when the obstacle is to the right of the center of the lane.

Alternatively, when there is an area to the right of an obstacle where the subject vehicle can travel, the constraint generator 230 may determine to steer right around the obstacle, irrespective of the position of the obstacle. For example, when the obstacle is another vehicle traveling ahead of the subject vehicle (a preceding vehicle), the subject vehicle can avoid the preceding vehicle without violating the Road Traffic Act even in a region where the driver must overtake the other vehicle on the right side.

Alternatively, when there is an area to the left of an obstacle where the subject vehicle can travel, the constraint generator 230 may determine to steer left around the obstacle, irrespective of the position of the obstacle. For example, when the obstacle is a preceding vehicle, the subject vehicle can avoid the preceding vehicle without violating the Road Traffic Act even in a region where the driver must overtake the other vehicle on the left side.

Next, the constraint generator 230 defines a no-entry zone in Step S232, and extends the no-entry zone in Step S233. The definition and extension of the no-entry zone will be described later.

Then in Step S234, the constraint generator 230 predicts the optimal state quantity x* using the previous optimal control input u*. Here, the constraint generator 230 computes the predicted optimal state quantity $\hat{X}^*_{k+1}$ (k=0, ..., N−1) using the next update equation.

$$\hat{x}^*_{k+1} = \hat{x}^*_k + f(\hat{x}^*_k, \hat{u}^*_k) \qquad \text{(Equation 124)}$$

Here, $\hat{x}^*_0 = x_0$ holds. Furthermore, $\hat{u}^*_k$ (k=0, ..., N−1) is a predicted optimal control input found from the next Equation using the previous optimal control input $u^*_k$ (k=0, ..., N−1).

$$\begin{aligned}
\hat{u}^*_0 &= u^*_1 \\
\hat{u}^*_1 &= u^*_2 \\
&\vdots \\
\hat{u}^*_{N-3} &= u^*_{N-2} \\
\hat{u}^*_{N-2} &= u^*_{N-1} \\
\hat{u}^*_{N-1} &= u^*_{N-1}
\end{aligned} \qquad \text{(Equation 125)}$$

Next in Step S235, the constraint generator 230 sets an upper limit value $\overline{Y}_c$ and a lower limit value $\underline{Y}_c$ of the center-of-gravity position $Y_c$ of the subject vehicle, and an upper limit value $\overline{\omega}$ (>0) and a lower limit value $\underline{\omega}$ (<0) of the steering speed ω. As a result, the constraint generator 230 generates the constraint represented by Equation 114. When AutoGen or ACADO is applied, the upper limit value $\overline{Y}_{c,k}$ and the lower limit value $\underline{Y}_{c,k}$ of the center-of-gravity position $Y_{c,k}$ of the subject vehicle at each predicted point k (k=1, ..., N) can be set. Thus, the upper limit value $\overline{Y}_{c,k}$ and the lower limit value $\underline{Y}_{c,k}$ of the center-of-gravity position $Y_{c,k}$ are set for each predicted point k (k=1, ..., N) according to Embodiment 1.

Figure 6:
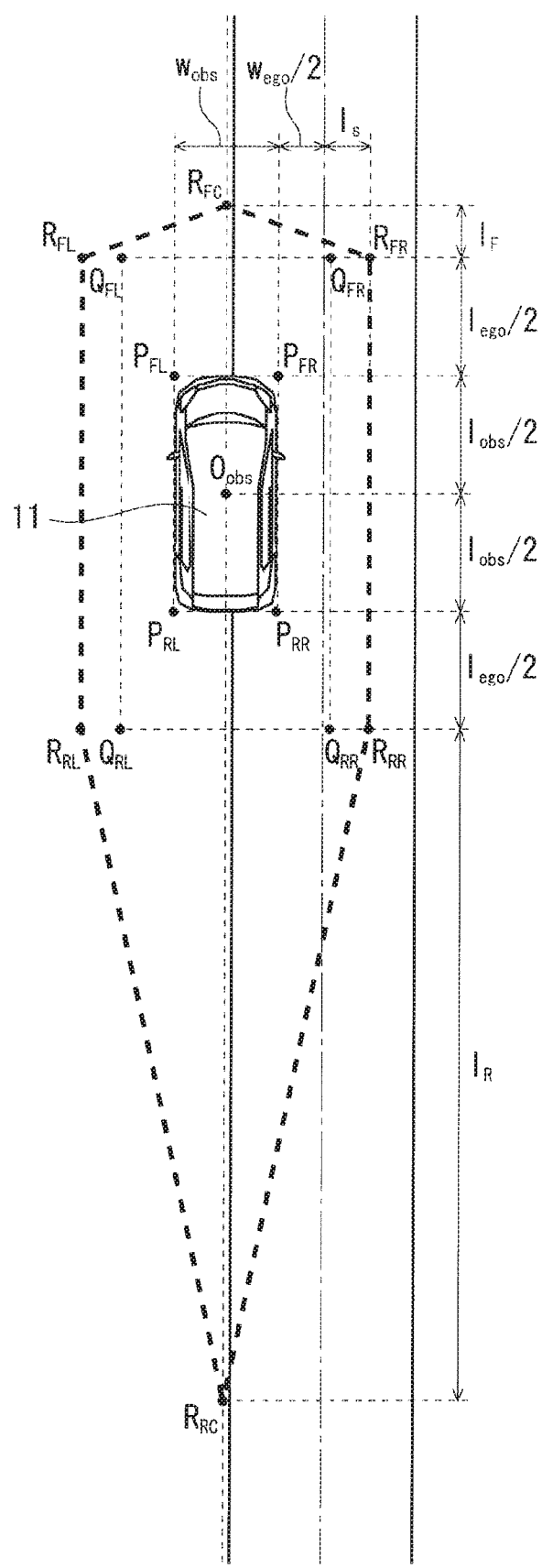
FIG. 6 illustrates a method for defining a no-entry zone according to Embodiment 1 of the present invention.

FIG. 6 illustrates a method for defining a no-entry zone in Step S232 of FIG. 5. It is assumed herein that the subject vehicle (not illustrated) is traveling along a straight road and that the obstacle information obtaining unit 110 detects the preceding vehicle 11 as an obstacle. It is also assumed that the preceding vehicle 11 is stopped or is traveling parallel to the lane and ahead on the left of the subject vehicle. Furthermore, the constraint generator 230 determines to steer right around the preceding vehicle 11. (overtake the preceding vehicle 11 on the right side). The lane may not be a straight road.

First as illustrated in FIG. 6, the constraint generator 230 defines a rectangular area with apexes $P_{FL}$, $P_{FR}$, $P_{RR}$, and $P_{RL}$ as an obstacle area (hereinafter referred to as an "obstacle area $P_{FL}P_{FR}P_{RR}P_{RL}$") based on the positions of the left front end $P_{FL}$, the right front end $P_{FR}$, the right rear end $P_{RR}$, and the left rear end $P_{RL}$ of the preceding vehicle 11 that are obtained by the obstacle information obtaining unit 110.

Next, the constraint generator 230 defines, as a collision area (hereinafter referred to as a "collision area $Q_{FL}Q_{FR}Q_{RR}Q_{RL}$"), a rectangular area with apexes $Q_{FL}$, $Q_{FR}$, $Q_{RR}$, and $Q_{RL}$ obtained by extending the obstacle area $P_{FL}P_{FR}P_{RR}P_{RL}$ both forward and backward (distant from and close to the subject vehicle) in a direction parallel to the lane by half the length $l_{ego}$ of the subject vehicle and also extending the obstacle area $P_{FL}P_{FR}P_{RR}P_{RL}$ both to the right and the left in a direction vertical to the lane by half the width $w_{ego}$ of the subject vehicle. The collision area $Q_{FL}Q_{FR}Q_{RL}$ is an area where the subject vehicle may collide with the preceding vehicle 11 when the subject vehicle is traveling parallel to the lane and the center of gravity of the subject vehicle enters the area.

Subsequently, the constraint generator 230 finds a point $R_{RC}$ closer to the subject vehicle by a distance $I_R$ than the midpoint of the side $Q_{RL}Q_{RR}$ that is the closest side of the collision area $Q_{FL}Q_{FR}Q_{RR}Q_{RL}$, a point $R_{FC}$ more distant from the subject vehicle by a distance $I_F$ than the midpoint of the side $Q_{FL}Q_{FR}$ that is the most distant side of the collision area $Q_{FL}Q_{FR}Q_{RR}Q_{RL}$, and apexes $R_{FL}$, $R_{FR}$, $R_{RR}$, and $R_{RL}$ of a rectangular area obtained by extending the collision area $Q_{FL}Q_{FR}Q_{RR}Q_{RL}$ both to the right and the left in the direction vertical to the lane by a distance $I_S$. Then, the constraint generator 230 defines a hexagonal area with apexes $R_{FL}$, $R_{FC}$, $R_{FR}$, $R_{RR}$, $R_{RC}$, and $R_{RL}$ as a no-entry zone (hereinafter referred to as a "no-entry zone $R_{FL}R_{FC}R_{FR}R_{RR}R_{RC}R_{RL}$"). Here, $I_R$, $I_F$, and $I_S$ are parameters for defining avoidance distances.

Defining the no-entry zone $R_{FL}R_{FC}R_{FR}R_{RR}R_{RC}R_{RL}$ enables clear specification of the avoidance distances. Furthermore, the values $I_R$, $I_F$, and $I_S$ can be appropriately changed, and are set according to, for example, the speed limit of a traveling lane of the subject vehicle. For example, when the subject vehicle is traveling in a lane with a speed limit of 40 km/h, a general stopping distance (a sum of a brake reaction distance and a braking distance) while the subject vehicle is traveling at a speed of 40 km/h is approximately 20 m. Thus, $I_R = 20$ [m] may be set. The shape of the no-entry zone is not limited to the hexagon, but may be any. Forming the no-entry zone into a convex shape (here, a convex hexagon) can increase the speed of finding the optimal solution and the problem solving possibility. In the presence of a plurality of obstacles, no-entry zones corresponding to the respective obstacles may be similarly set. An area outside of the lane (an area outside of a dividing line) may be added to the no-entry zone.

Figure 7:
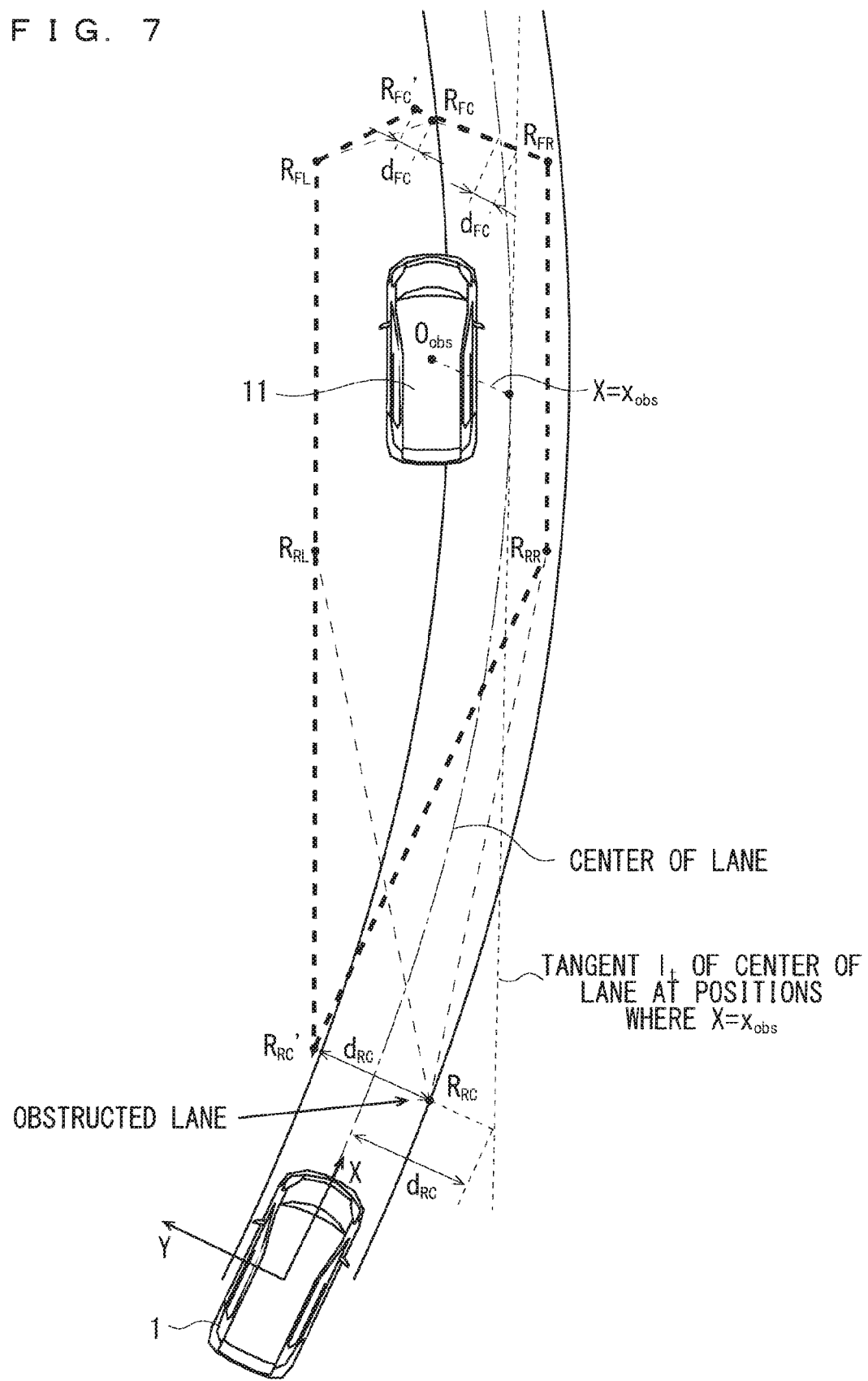
FIG. 7 illustrates an example no-entry zone modified according to a shape of a road.

However, when the preceding vehicle 11 that is an obstacle is on a curved road as illustrated in FIG. 7, the no-entry zone $R_{FL}R_{FC}R_{FR}R_{RR}R_{RC}R_{RL}$ set in the aforementioned method may obstruct the lane, irrespective of sufficient avoidance space to the side of the preceding vehicle 11. Thus, the constraint generator 230 modifies the shape of the no-entry zone according to the shape of the road.

FIG. 7 illustrates a no-entry zone $R_{FL}R_{FC'}R_{FR}R_{RR}R_{RC'}R_{RL}$ modified by the constraint generator 230 by replacing the apexes $R_{FC}$ and $R_{RC}$ of the no-entry zone $R_{FL}R_{FC}R_{FR}R_{RR}R_{RC}R_{RL}$ with points $R_{FC'}$ and $R_{RC'}$, respectively, according to the shape of the road. The points $R_{FC'}$ and $R_{RC'}$ are points obtained by moving the apexes $R_{FC}$ and $R_{RC}$ of the no-entry zone $R_{FL}R_{FC}R_{FR}R_{RR}R_{RC}R_{RL}$ by distances $d_{FC}$ and $d_{RC}$, respectively, in the Y direction of the subject-vehicle coordinate system (a lateral direction of the subject vehicle 1).

The constraint generator 230 defines the distances $d_{FC}$ and $d_{RC}$ as follows. First, the constraint generator 230 finds a tangent $I_t$ of the center of the lane at the positions where $X = x_{obs}$ (an x coordinate relative to the center $O_{obs}$ of the obstacle) holds in the subject-vehicle coordinate system. Then, the constraint generator 230 defines, as the distance $d_{FC}$, a Y-direction difference between the center of the lane and the tangent $I_t$ in the x coordinate of the point $R_{FC}$ and sets, as the distance $d_{RC}$, a Y-direction difference between the center of the lane and the tangent $I_t$ in the x coordinate of the point $R_{RC}$.

Figure 8:
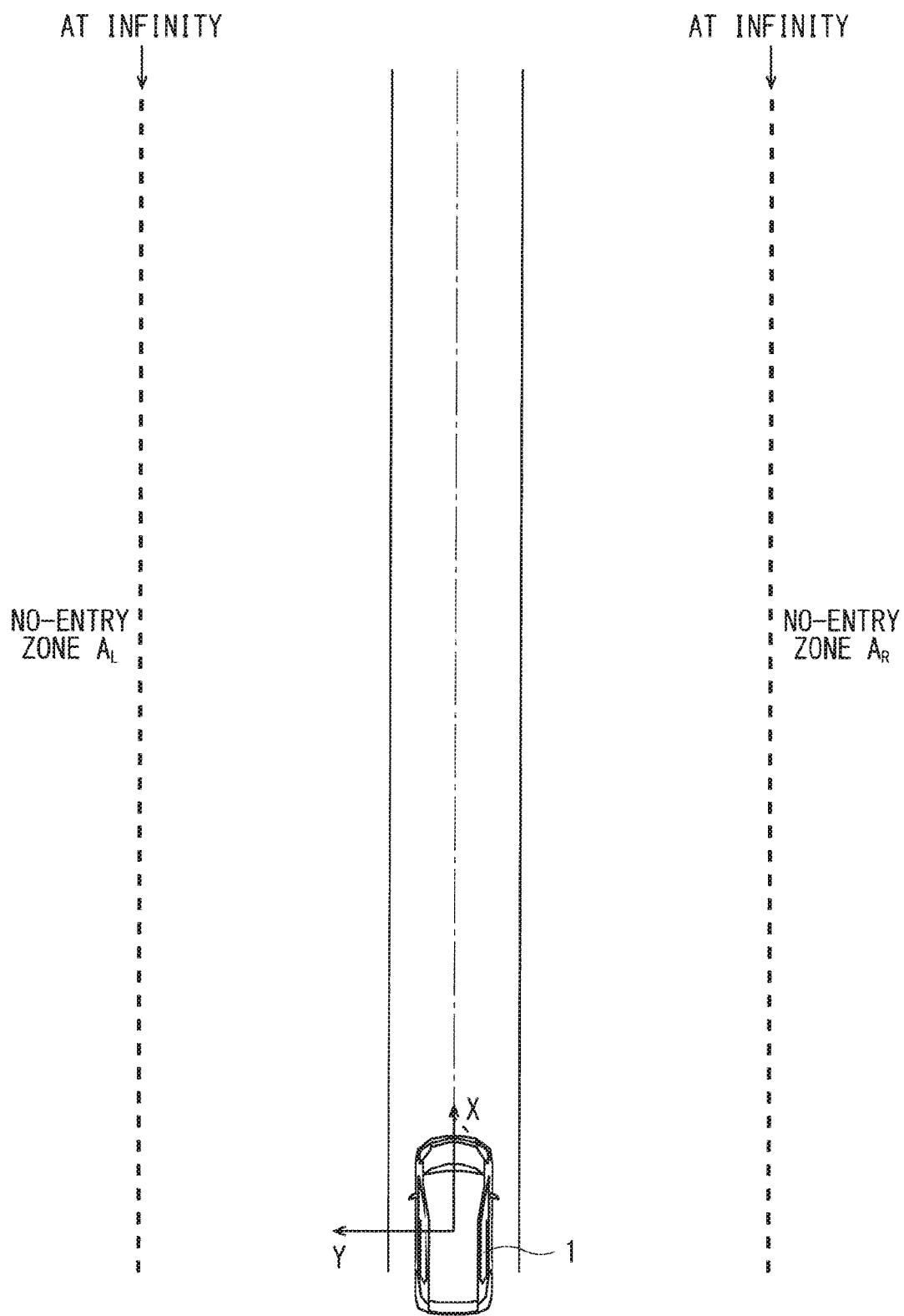
FIG. 8 illustrates example no-entry zones to be set at infinity.

Next, the extension of the no-entry zone performed in Step S233 of FIG. 5 will be described. As illustrated in FIG. 8, the constraint generator 230 presets no-entry zones $A_R$ and $A_L$ at infinity to the right and left of the subject vehicle 1, respectively. In other words, the no-entry zone $A_L$ is a zone located to the left of the traveling lane of the subject vehicle 1, and is a zone defined by $Y > \infty$. The no-entry zone $A_R$ is a zone located to the right of the traveling lane of the subject vehicle 1, and is a zone defined by $Y < -\infty$. The state where only the no-entry zones $A_R$ and $A_L$ are set as illustrated in FIG. 8 substantially indicates no constraint.

The constraint generator 230 combines the no-entry zone $R_{FL}R_{FC}R_{FR}R_{RR}R_{RC}R_{RL}$ set based on the position of the obstacle (the preceding vehicle 1) with one of the no-entry zones $A_R$ and $A_L$ to obtain an extended no-entry zone. The constraint generator 230 combines the no-entry zone $R_{FL}R_{FC}R_{FR}R_{RR}R_{RC}R_{RL}$ with the no-entry zone $A_L$ on the left when determining to steer right around the obstacle in Step S231 of FIG. 5, and combines the no-entry zone $R_{FL}R_{FC}R_{FR}R_{RR}R_{RC}R_{RL}$ with the no-entry zone $A_R$ on the right when determining to steer left around the obstacle in Step S231.

Figure 9:
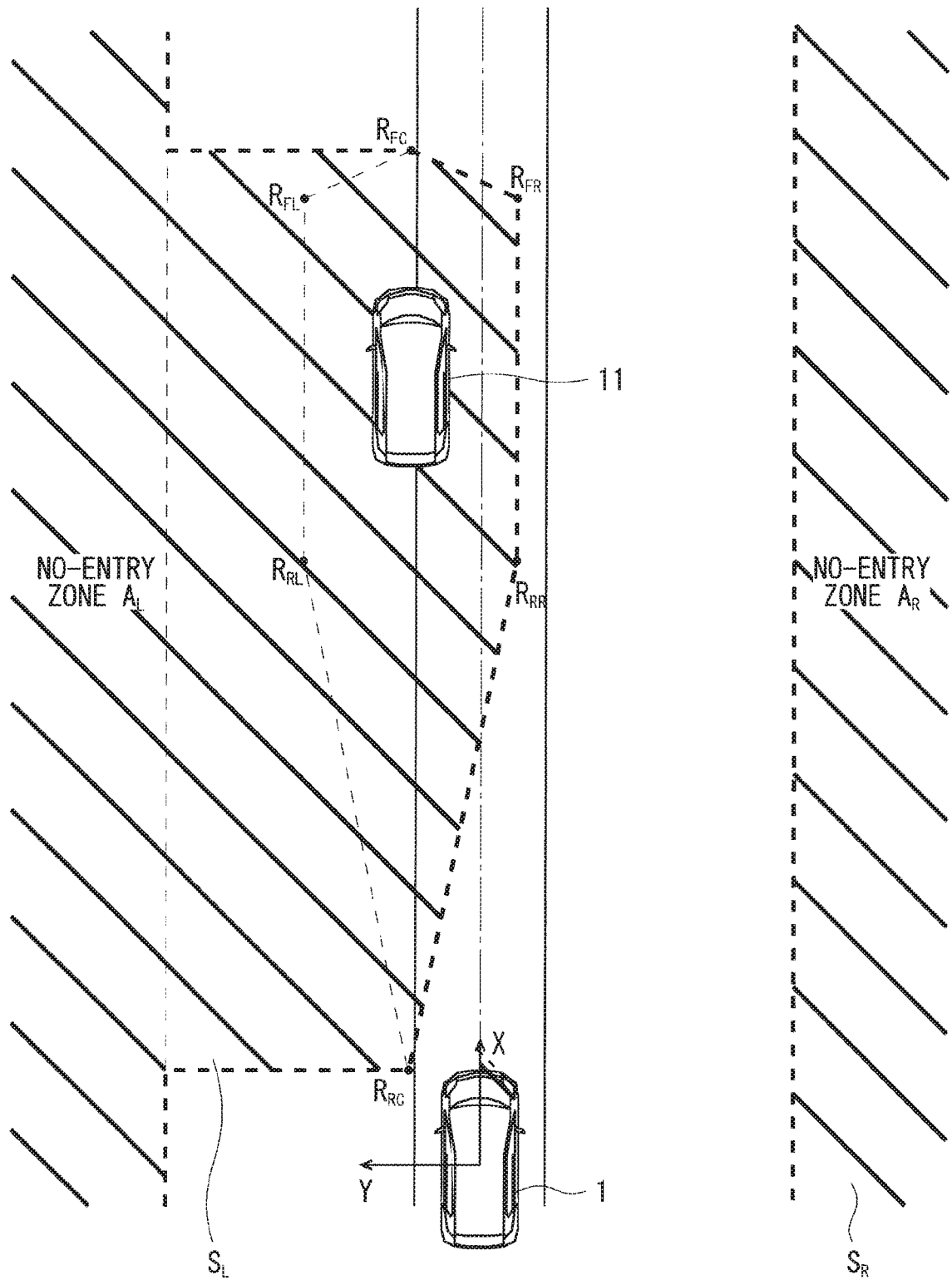
FIG. 9 illustrates an example of an extended no-entry zone.

For example, when the preceding vehicle 11 that is an obstacle is on the left of the lane as illustrated in FIG. 9, the constraint generator 230 determines to steer right around the preceding vehicle 11, and combines the no-entry zone $R_{FL}R_{FC}R_{FR}R_{RR}R_{RC}R_{RL}$ with the no-entry zone $A_L$ on the left. The constraint generator 230 defines, as final no-entry zones, the resulting diagonally shaded zones in FIG. 9. The final no-entry zone to the left will be referred to as a "no-entry zone $S_L$", and the final no-entry zone to the right will be referred to as a "no-entry zone $S_R$".

Figure 10:
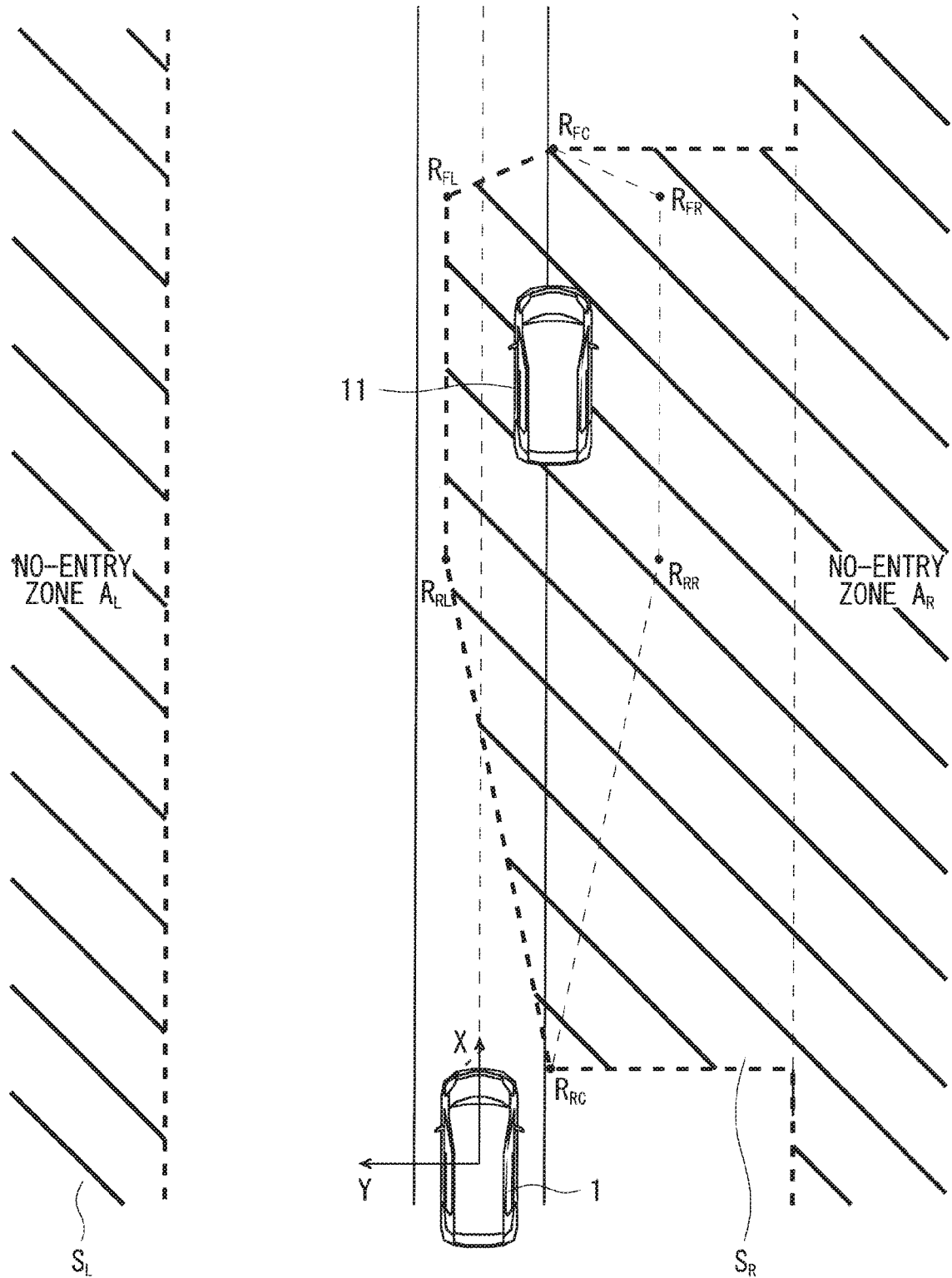
FIG. 10 illustrates an example of an extended no-entry zone.

For example, when the preceding vehicle 11 that is an obstacle is on the right of the lane as illustrated in FIG. 10, the constraint generator 230 determines to steer left around the preceding vehicle 11, and combines the no-entry zone $R_{FL}R_{FC}R_{FR}R_{RR}R_{RC}R_{RL}$ with the no-entry zone $A_R$ on the right. The constraint generator 230 defines the resulting diagonally shaded zones in FIG. 10 as the final no-entry zones $S_L$ and $S_R$.

Figure 11:
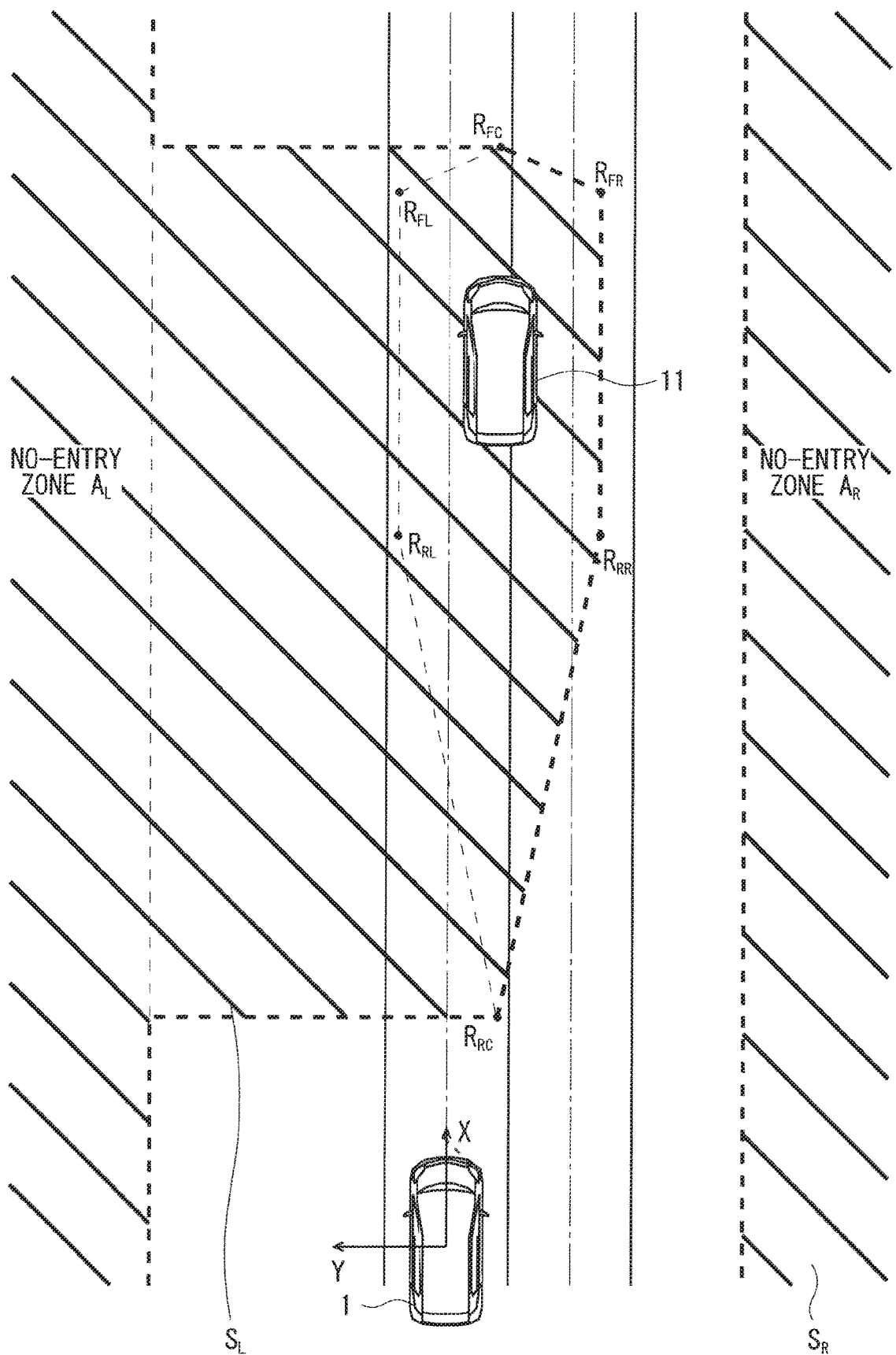
FIG. 11 illustrates an example of an extended no-entry zone.

As previously described, the constraint generator 230 may determine to steer right around the obstacle even when the obstacle is on the right of the traveling lane of the subject vehicle. Here, the constraint generator 230 combines the no-entry zone $R_{FL}R_{FC}R_{FR}R_{RR}R_{RC}R_{RL}$ with the no-entry zone $A_L$ on the left even when the obstacle (the preceding vehicle 11) is on the right of the traveling lane of the subject vehicle 1 as illustrated in FIG. 11. Consequently, the subject vehicle 1 can avoid the preceding vehicle 11 on the right of the traveling lane, using the adjacent right lane.

In the presence of a plurality of obstacles, the constraint generator 230 combines no-entry zones corresponding to the respective obstacles sequentially with the no-entry zone $A_R$ or $A_L$. Further, when an area outside of a dividing line is defined as a no-entry zone, the constraint generator 230 may combine the no-entry zones corresponding to the respective obstacles sequentially with the no-entry zone outside of the dividing line. Consequently, the final no-entry zone includes all the no-entry zones.

Figure 12:
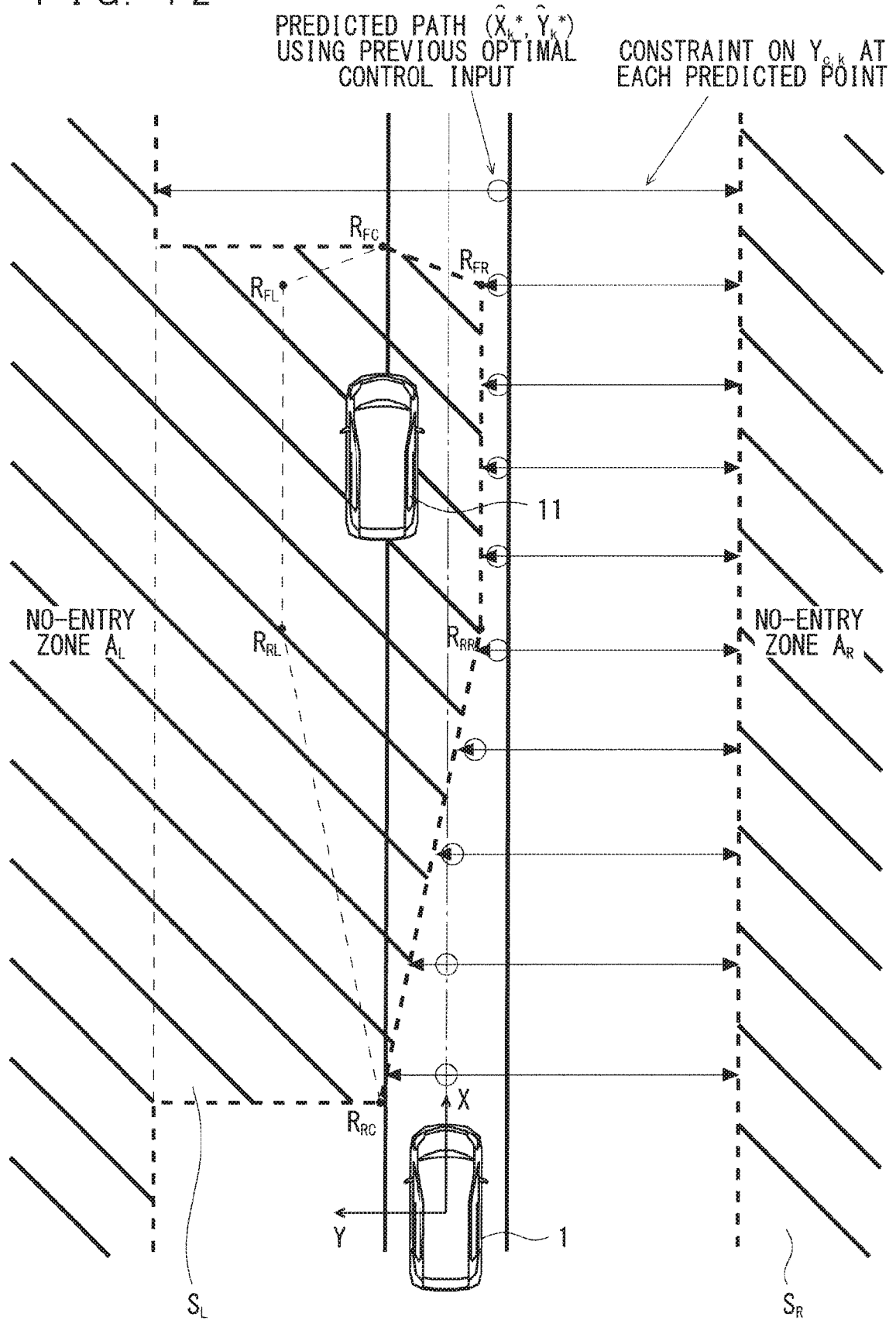
FIG. 12 illustrates an upper limit value and a lower limit value in a Y direction of the center of gravity of a vehicle.

Next, a method to be performed by the constraint generator 230 in Step S235 of FIG. 5 for setting the upper limit value $^-Y_{c,k}$ and the lower limit value $\_Y_{c,k}$ of the center-of-gravity position $Y_{c,k}$ of the subject vehicle 1 at each predicted point will be described with reference to FIG. 12.

The constraint generator 230 predicts a path of the subject vehicle 1 (^X*$_k$, ^Y*$_k$)(k=1, ..., N), based on the predicted optimal state quantity ^x*$_k$(k=1, ..., N) computed in Step S234 of FIG. 5. As indicated by the arrows in FIG. 12, when the x coordinate is denoted by each ^X*$_k$, the minimum value of a y coordinate of the no-entry zone $S_L$ on the left is defined as the upper limit value $^-Y_{c,k}$, and the maximum value of a y coordinate of the no-entry zone $S_R$ on the right is defined as the lower limit value $\_Y_{c,k}$. Establishing a constraint on the center-of-gravity position $Y_{c,k}$ enables representation of a possible range of the center-of-gravity position $Y_{c,k}$ by one continuous section, which can create advantages of simplifying an equation representing h constraints, reducing the computation load, and increasing a probability of finding a solution.

The obstacle avoidance apparatus 201 according to Embodiment 1 can perform the vehicle control for keeping a lane and the vehicle control for avoiding an obstacle with the same logic. The obstacle avoidance apparatus 201 can avoid an obstacle by setting a no-entry zone of the subject vehicle and establishing a constraint on a state variable of the subject vehicle to clearly specify the minimum value of a distance (an avoidance distance) between the subject vehicle and the obstacle. Moreover, predetermining whether to steer right or left around an obstacle ensures leeway until the avoidance and the smooth avoidance operation. Thus, the riding comfort will be improved. Combining a no-entry zone defined according to the position of an obstacle with a no-entry zone defined at infinity allows incorporation of an area corresponding to the obstacle to the right or the left of the no-entry zone into the final no-entry zone. This creates advantages of simplifying the shape of the no-entry zone, reducing the computation load, and increasing a probability of finding the optimal solution.

Embodiment 2

Although the vehicle control unit 200 performs only the steering control in Embodiment 1, Embodiment 2 will describe an example where the vehicle control unit 200 performs both the steering control and the acceleration and deceleration control. The configuration and the basic operations of an obstacle avoidance system according to Embodiment 2 are identical to those according to Embodiment 1. Thus, the overlap with the description of Embodiment 1 will be omitted.

When the vehicle control unit 200 performs both the steering control and the acceleration and deceleration control, the vehicle state quantity x and the control input u will be set as follows.

$$x = [X_c, Y_c, \theta, \beta, \Gamma, \delta, V, \alpha]^T \quad \text{(Equation 201)}$$

$$u = [\omega, j]^T \quad \text{(Equation 202)}$$

Here, α denotes an acceleration, and j denotes a jerk. Substituting the jerk for the acceleration as the control input, the magnitude of variations in acceleration can be easily limited depending on the evaluation function or the settings of the constraints. Thus, the riding comfort can be improved. The following two-wheel model will be used as the dynamic vehicle model f.

$$\dot{x} = f(x, u) = \quad \text{(Equation 203)}$$

$$\begin{bmatrix} V\cos(\theta + \beta) \\ V\sin(\theta + \beta) \\ \gamma \\ -\left(1 + \dfrac{2(C_f l_f - C_r l_r)}{MV^2}\right)\gamma - \dfrac{2}{MV}(C_f + C_r)\beta + \dfrac{2C_f}{MV}\delta \\ -\dfrac{2}{IV}(C_f l_f^2 + C_r l_r^2)\gamma - \dfrac{2}{I}(C_f l_f - C_r l_r)\beta + \dfrac{2}{I}C_f l_f \delta \\ \omega \\ \alpha \\ j \end{bmatrix}$$

$x = [X_c, Y_c, \theta, \beta, \gamma, \delta, V]^T$ and $u = [\omega, \alpha]^T$ may hold to simplify the model.

According to Embodiment 2, the vector-valued functions h and $h_N$ on an evaluation item will be set as follows so that the vehicle follows the target speed with a small control input.

$$h = [e_{Y,k}, \omega_k, e_{V,k}, j_k]^T \quad \text{(Equation 204)}$$

$$h_N = [e_{Y,N}, e_{Y,N}]^T \quad \text{(Equation 205)}$$

Here, $e_{V,k}$ denotes a speed following error that is an error in a predicted speed with respect to a target speed of the subject vehicle at the predicted point k (k=0, ..., N). Assuming the target speed as $V_{ref}$, the speed following error $e_{V,k} = V_k - V_{ref}$ holds. The target speed $V_{ref}$ is, for example, a speed limit of a traveling lane of the subject vehicle, and is obtained by the lane information obtaining unit 120. Then, the target values $r_k$ and $r_N$ will be set as follows so that the route following error $e_{Y,k}$, the steering speed $\omega_k$, the speed following error $e_{V,k}$, and the jerk $j_k$ are reduced (closer to 0).

$$r_k = [0, 0, 0]^T (k=0, \ldots, N-1) \quad \text{(Equation 206)}$$

$$r_N = [0, 0]^T \quad \text{(Equation 207)}$$

Consequently, speed control, lane keeping, and avoidance of an obstacle can be achieved with the same logic. Thus, the riding comfort will be improved. Although the route following error, the steering speed, the speed following error, and the jerk are set as the evaluation items according to Embodiment 2, for example, an acceleration may be added to the evaluation items to improve the riding comfort.

Assuming an upper limit value of the jerk j as $\overline{j} (>0)$ and a lower limit value thereof as $\underline{j} (<0)$, the function g will be set as follows to perform the acceleration and deceleration control with the jerk in a certain range according to Embodiment 2.

$$g = \begin{bmatrix} Y_c - \overline{Y}_c \\ -Y_c + \underline{Y}_c \\ \omega - \overline{\omega} \\ -\omega + \underline{\omega} \\ j - \overline{j} \\ -j + \underline{j} \end{bmatrix} \quad \text{(Equation 208)}$$

Setting the upper and lower limit values of the jerk j allows the vehicle control while the riding comfort is maintained. The upper and lower limit values of the acceleration may be set for maintaining the riding comfort, and the upper and lower limit values of the speed may be set for observing the speed limit.

Since the obstacle avoidance apparatus 201 according to Embodiment 2 can perform speed control, keep a lane, and avoid an obstacle with the same logic, the riding comfort of the subject vehicle will be further improved.

Embodiment 3

According to Embodiment 3, the constraint generator 230 of the obstacle avoidance apparatus 201 establishes a constraint on a position $X_c$ in the forward and backward directions of the subject vehicle when a preceding vehicle is in the traveling lane of the subject vehicle. The configuration and the basic operations of an obstacle avoidance system according to Embodiment 3 are identical to those according to Embodiment 1 or 2. Thus, the overlap with the description of Embodiments 1 and 2 will be omitted.

Figure 13:
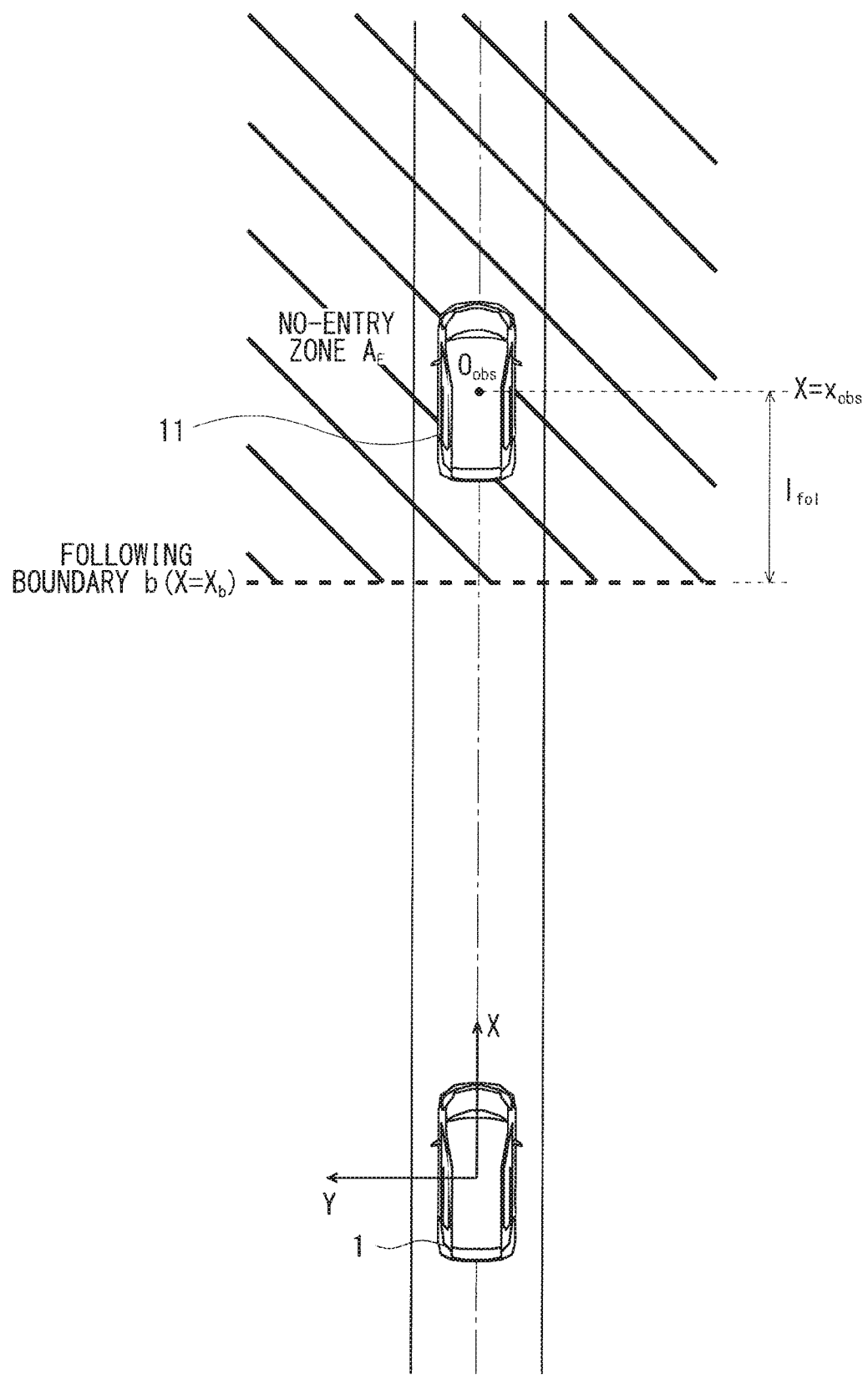
FIG. 13 illustrates an example no-entry zone to be defined by an obstacle avoidance system according to Embodiment 3 of the present invention.

For example, when the preceding vehicle 11 is ahead of the subject vehicle 1 as illustrated in FIG. 13, the subject vehicle 1 is made to follow the preceding vehicle 11 so that a vehicle spacing between the subject vehicle 1 and the preceding vehicle 11 is maintained at $I_{fol}$ or more. Thus, a following boundary b is set at a position $X_b$ that is closer to the subject vehicle I by $I_{fol}$ in a direction parallel to the lane than the position $x_{obs}$ in the X direction that is the center $O_{obs}$ of the preceding vehicle 11 at each predicted point. Then, an area more distant from the subject vehicle 1 with respect to the following boundary b, that is, an area satisfying $X > X_b$ is defined as a no-entry zone $A_F$. Here, $I_{fol}$ can be appropriately changed in a range of $I_{fol} > (I_{ego} + I_{obs})/2$. For example, when the subject vehicle is traveling in a lane with a speed limit of 40 km/h, a general stopping distance while the subject vehicle is traveling at a speed of 40 km/h is approximately 20 m. Thus, $I_{fol} = (I_{ego} + I_{obs})/2 + 20[m]$ may be set. This holds when the preceding vehicle is stopped.

Assuming an upper limit value of the center-of-gravity position $X_C$ of the subject vehicle 1 as $\overline{X}_C (>0)$, the function g will be set as follows to prevent the subject vehicle 1 from entering the no-entry zone $A_F$ according to Embodiment 3.

$$g = \begin{bmatrix} Y_c - \overline{Y}_c \\ -Y_c + \underline{Y}_c \\ \omega - \overline{\omega} \\ -\omega + \underline{\omega} \\ X_c - \overline{X}_c \end{bmatrix} \quad \text{(Equation 301)}$$

The upper limit value $\overline{X}_{C,k} = X_{b,k}$ is set using the position $X_{b,k}$ (k=1, ..., N) of the following boundary b at each predicted point.

When a preceding vehicle is in the traveling lane of the subject vehicle, the obstacle avoidance apparatus 201 according to Embodiment 3 can make the subject vehicle follow the preceding vehicle so that a vehicle spacing between the subject vehicle and the preceding vehicle is maintained at a certain value or more.

Embodiment 4

When a preceding vehicle is in a traveling lane of the subject vehicle, the constraint generator 230 of the obstacle avoidance apparatus 201 establishes a constraint on an upper speed limit according to the vehicle spacing between the subject vehicle and the preceding vehicle according to Embodiment 4. The configuration and the basic operations of an obstacle avoidance system according to Embodiment 4 are identical to those according to Embodiment 1, 2, or 3. Thus, the overlap with the description of Embodiments 1 to 3 will be omitted.

Assuming an upper limit value of the speed V as $\overline{V}$ (>0), the function g will be set as follows to establish a constraint on the upper speed limit according to Embodiment 4.

$$g = \begin{bmatrix} Y_c - \overline{Y}_c \\ -Y_c + \underline{Y}_c \\ \omega - \overline{\omega} \\ -\omega + \underline{\omega} \\ V_c - \overline{V} \end{bmatrix} \quad \text{(Equation 401)}$$

Figure 14:
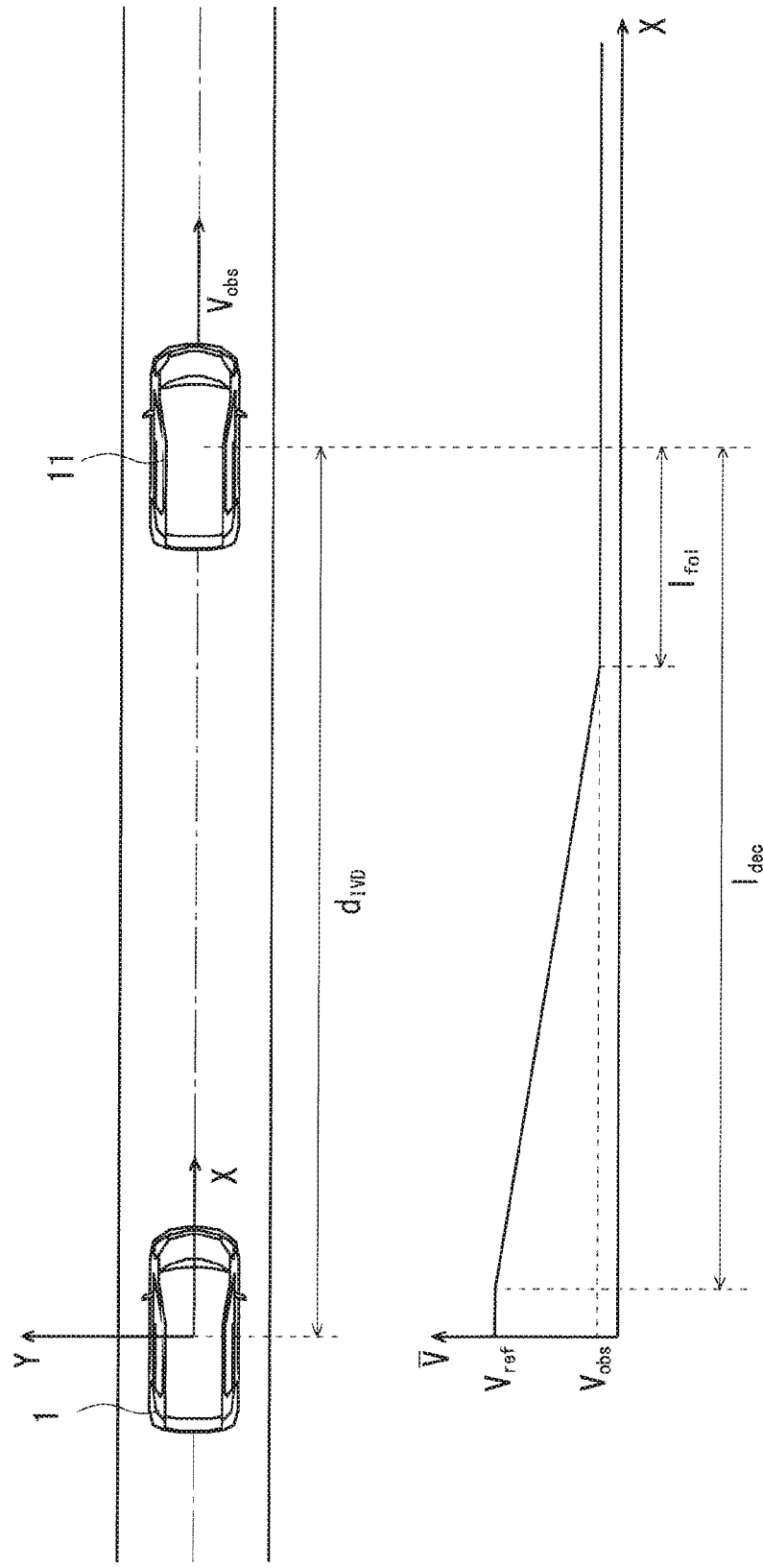
FIG. 14 illustrates an example constraint on an upper speed limit to be set by an obstacle avoidance system according to Embodiment 4 of the present invention.

When the preceding vehicle 11 is ahead of the subject vehicle 1 as an obstacle as illustrated in FIG. 14, the constraint generator 230 sets the upper limit value of the speed $\overline{V}_k$ according to a vehicle spacing $d_{IVD,k} = x_{obs,k} - X_{c,k}$ (k=1, . . . , N) between the subject vehicle 1 and the preceding vehicle 11 at each predicted point so that the subject vehicle 1 follows the preceding vehicle 11 to maintain the vehicle spacing at $I_{fol}$ or more. The graph illustrated in FIG. 14 indicates an example relationship between the position of the subject vehicle in the X direction and the upper limit value of the speed $\overline{V}_k$.

When the vehicle spacing $d_{IVD,k}$ between the subject vehicle 1 and the preceding vehicle 11 is sufficiently large, the subject vehicle 1 may travel at the target speed. Thus, the constraint generator 230 uses, as a threshold, a distance $I_{dec}$ predefined as a sufficient vehicle spacing, and sets $\overline{V}_k = V_{ref}$ if $d_{IVD,k} > I_{dec}$.

When the vehicle spacing between the subject vehicle 1 and the preceding vehicle 11 is shortened and $d_{IVD,k} \leq I_{fol}$ holds, the subject vehicle 1 needs to travel at a speed lower than that of the preceding vehicle 11 to maintain the vehicle spacing at $I_{fol}$ or more. Thus, the constraint generator 230 refers to the speed $V_{obs,k}$ (k=1, . . . , N) of the preceding vehicle 11 at each predicted point. Then, the constraint generator 230 sets $\overline{V}_k = V_{obs,k}$ if $d_{IVD,k} = I_{fol}$, and makes the setting so that $\overline{V}_k \leq V_{obs,k}$ is satisfied and $\overline{V}_k$ becomes continuous and smooth if $d_{IVD,k} < I_{fol}$.

If $I_{fol} < d_{IVD}$ and $k \leq I_{dec}$, the constraint generator 230 makes the setting so that $\overline{V}_k$ continuously, smoothly, and monotonously decreases as $d_{IVD,k}$ decreases. Consequently, the control is possible so that the subject vehicle 1 starts to decelerate when the vehicle spacing $d_{IVD,k}$ is smaller than or equal to the distance $I_{dec}$ and so that the speed of the subject vehicle 1 is equal to the speed of the preceding vehicle 11 if the vehicle spacing $d_{IVD,k} = I_{fol}$.

The obstacle avoidance apparatus 201 according to Embodiment 4 can make the subject vehicle follow the preceding vehicle so that a vehicle spacing with the preceding vehicle is maintained at a certain value or more, irrespective of the shape of the no-entry zone. Even when a difference in speed between the subject vehicle and the preceding vehicle is significant upon detection of the preceding vehicle, the obstacle avoidance apparatus 201 can smoothly make the subject vehicle follow the preceding vehicle.

Embodiment 5

Figure 15:
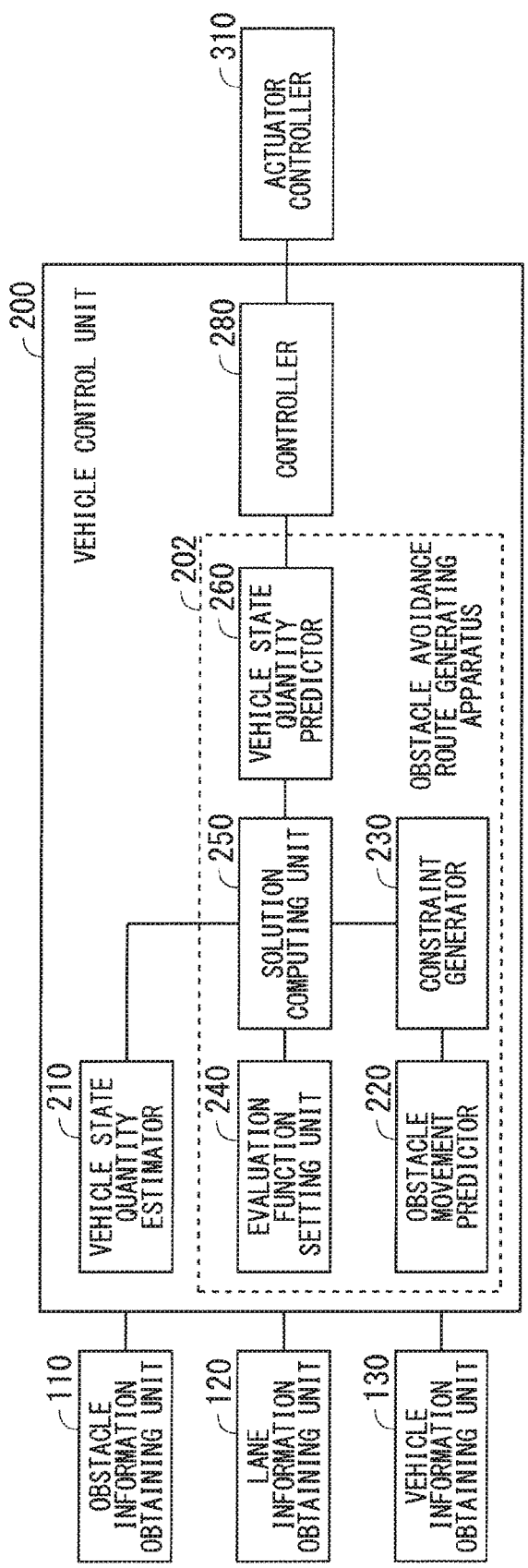
FIG. 15 is a block diagram illustrating a configuration of an obstacle avoidance system according to Embodiment 5 of the present invention.

FIG. 15 is a block diagram illustrating a configuration of an obstacle avoidance system according to Embodiment 5 of the present invention. The same reference numerals will be assigned to the constituent elements having the same functions as those illustrated in FIG. 1, and the detailed description thereof will be omitted herein.

The vehicle control unit 200 according to Embodiment 5 includes an obstacle avoidance route generating apparatus 202, the vehicle state quantity estimator 210, and a controller 280. The vehicle state quantity estimator 210 has functions identical to the functions of that illustrated in FIG. 1. The obstacle avoidance route generating apparatus 202 has the same configuration as that of the obstacle avoidance apparatus 201 illustrated in FIG. 1 except for the target value computing unit 270, and generates a traveling route of the subject vehicle. The controller 280 computes a target value of an actuator so that the subject vehicle is made to follow the route generated by the vehicle state quantity predictor 260. The actuator controller 310 controls the actuator so that the actuator attains the target value.

Next, operations of the obstacle avoidance system according to Embodiment 5 will be described. The overlap with the description of Embodiments 1 to 4 will be also omitted.

According to Embodiment 5, the vehicle state quantity predictor 260 of the obstacle avoidance route generating apparatus 202 performs the whole processes to generate a route of the subject vehicle. If the route is smooth, there is no need to smooth the steering angle. Thus according to Embodiment 5, the vehicle state quantity x and the control input u will be set as follows.

$$x = [X_c, Y_c, \theta, \beta, \gamma]^T \quad \text{(Equation 501)}$$

$$u = [\delta]^T \quad \text{(Equation 502)}$$

Consequently, the computation load of the obstacle avoidance route generating apparatus 202 can be reduced more than that of the obstacle avoidance apparatus 201 according to Embodiment 1. Here, the vehicle control unit 200 performs only the steering control. The following two-wheel model will be used as the dynamic vehicle model.

$$\dot{x} = f(x, u) = \begin{bmatrix} V\cos(\theta + \beta) \\ V\sin(\theta + \beta) \\ \gamma \\ -\left(1 + \frac{2(C_f l_f - C_r l_r)}{MV^2}\right)\gamma - \frac{2}{MV}(C_f + C_r)\beta + \frac{2C_f}{MV}\delta \\ -\frac{2}{IV}(C_f l_f^2 + C_r l_r^2)\gamma - \frac{2}{I}(C_f l_f - C_r l_r)\beta + \frac{2}{I}C_f l_f \delta \end{bmatrix} \quad \text{(Equation 503)}$$

FIG. 16 is a flowchart indicating the operations of the obstacle avoidance system according to Embodiment 5. FIG. 16 is the same as FIG. 4 except for Step S280.

In Step S280, the controller 280 computes the target value of the actuator so that the subject vehicle is made to follow the optimal route $(X_{c,k}^*, Y_{c,k}^*)$. Known technologies such as a PID controller for keeping a lane, a sliding mode controller, and an H ∞ controller are applicable for computing the target value herein.

The obstacle avoidance route generating apparatus 202 according to Embodiment 5 can generate a route for keeping a lane and for avoiding an obstacle with the same logic. Similarly as Embodiment 1, the obstacle avoidance route generating apparatus 202 can avoid an obstacle by setting a no-entry zone of the subject vehicle and establishing a constraint on a state variable of the subject vehicle to clearly specify the minimum value of a distance (an avoidance distance) between the subject vehicle and the obstacle. Moreover, predetermining whether to steer right or left around an obstacle ensures leeway until the avoidance and the smooth avoidance operation. Thus, the riding comfort will be improved. The obstacle avoidance route generating apparatus 202 combines an area to the right or left of a no-entry zone defined according to the position of an obstacle, with a no-entry zone defined at infinity to obtain the final no-entry zone. This creates advantages of simplifying the shape of the final no-entry zone, reducing the computation load, and increasing a probability of finding the optimal solution. A separate controller (the controller 280) can be used to compute the target value of the actuator for making the subject vehicle follow a route.

Embodiments according to the present invention can be freely combined or appropriately modified and omitted within the scope of the invention.

What is claimed is:

1. An obstacle avoidance apparatus, comprising:
   a processor to execute a program; and
   a memory to store the program which, when executed by the processor, performs processes of:
   predicting movement of an obstacle around a subject vehicle, based on obstacle information including information on a position of the obstacle;
   establishing a constraint on a state quantity or a control input of the subject vehicle by determining whether to steer right or left around the obstacle based on the predicted movement of the obstacle and defining a no-entry zone including the position of the obstacle for preventing the subject vehicle from colliding with at least the obstacle;
   setting an evaluation function for evaluating at least a route following error as an evaluation item so that a degree of evaluation increases as the route following error is smaller, the route following error being an error in a predicted route with respect to a target route of the subject vehicle;
   computing, under the constraint, a solution for increasing the degree of evaluation on the evaluation function;
   computing a predicted value of the state quantity of the subject vehicle based on the solution; and
   computing a target value of an actuator that controls an amount of steering of the subject vehicle, based on at least one of the solution and the predicted value of the state quantity,
   wherein the processor extends the no-entry zone, by combining, with the no-entry zone including the position of the obstacle, another no-entry zone to the left of the obstacle that is preset at infinity or outside of a lane when determining to steer right around the obstacle, and combining, with the no-entry zone including the position of the obstacle, another no-entry zone to the right of the obstacle that is preset at infinity or outside of the lane when determining to steer left around the obstacle,
   before the combining, the no-entry zone including the position of the obstacle and the another no-entry zone are separated from each other by an entry zone located between the no-entry zone including the position of the obstacle and the another no-entry zone, and
   when a shape of a road changes from a straight road to a curved road, the processor modifies a shape of the no-entry zone by moving a forward apex and a rear apex of the no-entry zone according to the shape of the road.

2. The obstacle avoidance apparatus according to claim 1, wherein evaluation items of the evaluation function include a speed following error that is an error in a predicted speed with respect to a target speed of the subject vehicle, and the degree of evaluation on the evaluation function increases as the speed following error is smaller, and
   the processor computes a target value of an actuator that controls an amount of acceleration or deceleration of the subject vehicle.

3. The obstacle avoidance apparatus according to claim 1, wherein the processor determines to steer right around the obstacle when the obstacle is to the left of a center of a traveling lane of the subject vehicle, and determines to steer left around the obstacle when the obstacle is to the right of the center of the traveling lane of the subject vehicle.

4. The obstacle avoidance apparatus according to claim 1, wherein the processor determines to steer right around the obstacle when there is a space to the right of the obstacle where the subject vehicle can travel.

5. The obstacle avoidance apparatus according to claim 1, wherein the processor determines to steer left around the obstacle when there is a space to the left of the obstacle where the subject vehicle can travel.

6. The obstacle avoidance apparatus according to claim 1, wherein when failing to obtain a solution with which the evaluation function falls below or exceeds a predefined threshold even by performing repeated calculation a predefined number of times in computing the solution, the processor selects and outputs one of solutions obtained from the repeated calculations.

7. The obstacle avoidance apparatus according to claim 1, wherein the processor incorporates, into the no-entry zone, an area outside of a dividing line of a traveling lane of the subject vehicle.

8. The obstacle avoidance apparatus according to claim 1, wherein when a preceding vehicle is in a traveling lane of the subject vehicle as the obstacle, the processor defines the no-entry zone so that a vehicle spacing between the subject vehicle and the preceding vehicle is prohibited from becoming less than or equal to a predefined value, and
   the processor computes a target value of an actuator that controls an amount of acceleration or deceleration of the subject vehicle.

9. The obstacle avoidance apparatus according to claim 1, wherein in the case where a preceding vehicle is in a traveling lane of the subject vehicle as the obstacle, the processor establishes a constraint on an upper speed limit of the subject vehicle according to a vehicle spacing between the subject vehicle and the preceding vehicle, reduces the upper speed limit as the vehicle spacing is shorter, and sets the upper speed limit lower than or equal to a speed of the preceding vehicle when the vehicle spacing is less than or equal to a predefined value, and
   the processor computes a target value of an actuator that controls an amount of acceleration or deceleration of the subject vehicle.

10. The obstacle avoidance apparatus according to claim 1, wherein the processor further establishes a constraint on an upper limit or a lower limit of at least one of an acceleration, a jerk, a steering speed, and a yaw rate of the subject vehicle.

11. The obstacle avoidance apparatus according to claim 1, wherein evaluation items of the evaluation function include at least one of an acceleration, a jerk, a steering speed, and a yaw rate of the subject vehicle, and the degree of evaluation on the evaluation function increases as the acceleration, the jerk, the steering speed, and the yaw rate of the subject vehicle that are included in the evaluation items are closer to 0.

12. The obstacle avoidance apparatus according to claim 1,
wherein in the presence of a plurality of obstacles, the processor defines a plurality of no-entry zones corresponding to the respective obstacles, and defines an area including all the plurality of no-entry zones as a final no-entry zone.

13. The obstacle avoidance apparatus according to claim 1, wherein:
when the shape of the road changes from the straight road to the curved road, the processor modifies the shape of the no-entry zone by moving the forward apex and the rear apex of the no-entry zone by a first distance and a second distance in the lateral direction of the subject vehicle, respectively, and
the first distance denotes a lateral-direction difference between a center of the lane at a position of the forward apex and a tangent of the center of the lane at the position of the obstacle, and the second distance denotes a lateral-direction difference between the center of the lane at a position of the rear apex and the tangent of the center of the lane at the position of the obstacle.

14. The obstacle avoidance apparatus according to claim 1,
wherein the processor predicts the movement of the obstacle based on at least the position of the obstacle among the position, a speed, and an orientation of the obstacle.

15. The obstacle avoidance apparatus according to claim 1,
wherein the processor forms the no-entry zone into a convex shape having the forward apex and the rear apex.

16. The obstacle avoidance apparatus according to claim 1,
wherein when a shape of a road changes from a straight road to a curved road, the processor modifies a shape of the no-entry zone by moving a forward apex and a rear apex of the no-entry zone in a lateral direction of the subject vehicle.

17. An obstacle avoidance route generating apparatus, comprising:
a processor to execute a program; and
a memory to store the program which, when executed by the processor, performs processes of:
predicting movement of an obstacle around a subject vehicle, based on obstacle information including information on a position of the obstacle;
establishing a constraint on a state quantity or a control input of the subject vehicle by determining whether to steer right or left around the obstacle based on the predicted movement of the obstacle and defining a no-entry zone including the position of the obstacle for preventing the subject vehicle from colliding with at least the obstacle;
setting an evaluation function for evaluating at least a route following error as an evaluation item so that a degree of evaluation increases as the route following error is smaller, the route following error being an error in a predicted route with respect to a target route of the subject vehicle;
computing, under the constraint, a solution for increasing the degree of evaluation on the evaluation function; and
computing a predicted value of the state quantity of the subject vehicle based on the solution, the state quantity including a route of the subject vehicle,
wherein the processor extends the no-entry zone by combining, with the no-entry zone including the position of the obstacle, another no-entry zone to the left of the obstacle that is preset at infinity or outside of a lane when determining to steer right around the obstacle, and combining, with no-entry zone including the position of the obstacle, another no-entry zone to the right of the obstacle that is preset at infinity or outside of the lane when determining to steer left around the obstacle,
before the combining, the no-entry zone including the position of the obstacle and the another no-entry zone are separated from each other by an entry zone located between the no-entry zone including the position of the obstacle and the another no-entry zone, and
when a shape of a road changes from a straight road to a curved road, the processor modifies a shape of the no-entry zone by moving a forward apex and a rear apex of the no-entry zone according to the shape of the road.

18. The obstacle avoidance route generating apparatus according to claim 17,
wherein the processor determines to steer right around the obstacle when the obstacle is to the left of a center of a traveling lane of the subject vehicle, and determines to steer left around the obstacle when the obstacle is to the right of the center of the traveling lane of the subject vehicle.

19. The obstacle avoidance route generating apparatus according to claim 17,
wherein the processor determines to steer right around the obstacle when there is a space to the right of the obstacle where the subject vehicle can travel.

20. The obstacle avoidance route generating apparatus according to claim 17,
wherein the processor determines to steer left around the obstacle when there is a space to the left of the obstacle where the subject vehicle can travel.

21. The obstacle avoidance route generating apparatus according to claim 17,
wherein the processor outputs a solution with which the evaluation function falls below or exceeds a predefined threshold, in computing the solution.

22. The obstacle avoidance route generating apparatus according to claim 17,
wherein when failing to obtain a solution with which the evaluation function falls below or exceeds a predefined threshold even by performing repeated calculation a predefined number of times in computing the solution, the processor selects and outputs one of solutions obtained from the repeated calculations.

23. The obstacle avoidance route generating apparatus according to claim 17,
wherein the processor incorporates, into the no-entry zone, an area outside of a dividing line of a traveling lane of the subject vehicle.

24. The obstacle avoidance route generating apparatus according to claim 17,
wherein the processor further establishes a constraint on an upper limit or a lower limit of at least one of an acceleration, a jerk, a steering speed, and a yaw rate of the subject vehicle.

25. The obstacle avoidance route generating apparatus according to claim 17,
wherein evaluation items of the evaluation function include at least one of an acceleration, a jerk, a steering speed, and a yaw rate of the subject vehicle, and the degree of evaluation on the evaluation function increases as the acceleration, the jerk, the steering speed, and the yaw rate of the subject vehicle that are included in the evaluation items are closer to 0.

26. The obstacle avoidance route generating apparatus according to claim 17,
wherein in the presence of a plurality of obstacles, the processor defines a plurality of no-entry zones corresponding to the respective obstacles, and defines an area including all the plurality of no-entry zones as a final no-entry zone.

27. The obstacle avoidance route generating apparatus according to claim 17, wherein:
when the shape of the road changes from the straight road to the curved road, the processor modifies the shape of the no-entry zone by moving the forward apex and the rear apex of the no-entry zone by a first distance and a second distance in the lateral direction of the subject vehicle, respectively, and
the first distance denotes a lateral-direction difference between a center of the lane at a position of the forward apex and a tangent of the center of the lane at the position of the obstacle, and the second distance denotes a lateral-direction difference between the center of the lane at a position of the rear apex and the tangent of the center of the lane at the position of the obstacle.

28. The obstacle avoidance route generating apparatus according to claim 17,
wherein the processor predicts the movement of the obstacle based on at least the position of the obstacle among the position, a speed, and an orientation of the obstacle.

29. The obstacle avoidance route generating apparatus according to claim 17, wherein the processor forms the no-entry zone into a convex shape having the forward apex and the rear apex.

30. The obstacle avoidance apparatus according to claim 1,
wherein when a shape of a road changes from a straight road to a curved road, the processor modifies a shape of the no-entry zone by moving a forward apex and a rear apex of the no-entry zone in a lateral direction of the subject vehicle.

* * * * *